(12) United States Patent  
Barnea et al.

(10) Patent No.: US 11,634,326 B2  
(45) Date of Patent: Apr. 25, 2023

(54) SEPARATION AND CONCENTRATION OF NITRATE FROM AQUEOUS SOLUTIONS AND GASEOUS STREAMS

(71) Applicant: Clairion Ltd., Netanya (IL)

(72) Inventors: Zach Barnea, Jerusalem (IL); Revital Mali, Mevaseret Zion (IL)

(73) Assignee: Clairion Ltd., Netanya (IL)

( * ) Notice: Subject to any disclaimer, the term of this patent is extended or adjusted under 35 U.S.C. 154(b) by 0 days.

(21) Appl. No.: 17/299,994

(22) PCT Filed: Dec. 5, 2019

(86) PCT No.: PCT/IL2019/051331  
§ 371 (c)(1),  
(2) Date: Jun. 4, 2021

(87) PCT Pub. No.: WO2020/115749  
PCT Pub. Date: Jun. 11, 2020

(65) Prior Publication Data  
US 2022/0017365 A1   Jan. 20, 2022

Related U.S. Application Data

(60) Provisional application No. 62/775,932, filed on Dec. 6, 2018.

(51) Int. Cl.  
*B01D 11/04* (2006.01)  
*B01D 53/14* (2006.01)  
(Continued)

(52) U.S. Cl.  
CPC .......... *C01B 21/46* (2013.01); *B01D 11/0492* (2013.01); *B01D 53/1493* (2013.01);  
(Continued)

(58) Field of Classification Search  
CPC ............ B01D 11/0492; B01D 53/1493; B01D 2257/302; B01D 2251/106;  
(Continued)

(56) References Cited

U.S. PATENT DOCUMENTS

| | | |
|---|---|---|
| 8,101,144 B2 | 1/2012 | Sasson et al. |
| 9,114,360 B2 | 8/2015 | Sasson et al. |

(Continued)

FOREIGN PATENT DOCUMENTS

| | | |
|---|---|---|
| CN | 106048221 A | 10/2016 |
| GB | 878244 | 9/1961 |

(Continued)

OTHER PUBLICATIONS

Kumari et al., "Investigation of a novel ionic liquid, Cyphos IL 104 for the solvent extraction of mineral acids", Hydrometallurgy, Elsevier Scientific Publishing CY. Amsterdam, NL, vol. 165, Sep. 21, 2015, pp. 159-165.

(Continued)

*Primary Examiner* — Timothy C Vanoy  
(74) *Attorney, Agent, or Firm* — McCormick, Paulding & Huber PLLC

(57) ABSTRACT

A process for recovering nitric acid or salts thereof, comprising: contacting, in the presence of water, an water-immiscible ionic liquid of the formula $[A^+][X^-]$, wherein $[A^+]$ represents a phosphonium or ammonium cation and $[X^-]$ represents a counter anion which is $NO_3^-$, an halide anion displaceable by $NO_3^-$, or both, with a fluid which contains $HNO_3$ and at least one more mineral acid, or precursors of said acids, and partition, under mixing, said acids between aqueous and organic phases and form nitrate-loaded ionic liquid of the formula $[A^+][NO_3^-]_{z>0.25}$ where Z indicates a molar amount of nitrate held in the ionic liquid beyond the positions occupied by the nitrate counter ions;

(Continued)

separating the so-formed mixture into an organic phase comprising a nitrate-loaded ionic liquid of the formula $[A^+][NO_3^-]_{z>0.25}$ and an aqueous phase consisting of a nitrate-depleted aqueous solution that contains the other mineral acid(s); stripping the nitric acid from said nitrate-loaded ionic liquid to create an aqueous nitrate solution and regenerate ionic liquid of the formula $[A^+][NO_3^-]_{z\geq 0}$ with reduced nitrate loading, or unloaded $[A^+][NO_3^-]_{z=0}$ ionic liquid.

18 Claims, 8 Drawing Sheets

(51) Int. Cl.
  *C01B 21/42*  (2006.01)
  *C01B 21/46*  (2006.01)
(52) U.S. Cl.
  CPC ........ *C01B 21/42* (2013.01); *B01D 2251/108* (2013.01); *B01D 2252/30* (2013.01); *B01D 2257/302* (2013.01); *B01D 2257/402* (2013.01); *B01D 2258/0283* (2013.01)
(58) Field of Classification Search
  CPC .......... B01D 53/1418; B01D 2251/108; B01D 2251/104; B01D 2252/30; B01D 53/1456; B01D 53/1425; B01D 2257/402; B01D 2258/0283; B01D 2257/404; B01D 11/0446; C01B 21/46; C01B 21/42
  See application file for complete search history.

(56) References Cited

U.S. PATENT DOCUMENTS

| | | |
|---|---|---|
| 9,289,719 B2 | 3/2016 | Riisager et al. |
| 9,561,466 B2 | 2/2017 | Sasson et al. |
| 2005/0183337 A1 | 8/2005 | Cadours et al. |

FOREIGN PATENT DOCUMENTS

| | | |
|---|---|---|
| JP | 2014051730 A | 3/2014 |
| JP | 2016-10760 A | 1/2016 |
| WO | 2015/106324 A1 | 7/2015 |
| WO | 2017216788 A1 | 12/2017 |

OTHER PUBLICATIONS

International Search Report for PCT Serial No. PCT/IL2019/051331 dated Jun. 26, 2020.

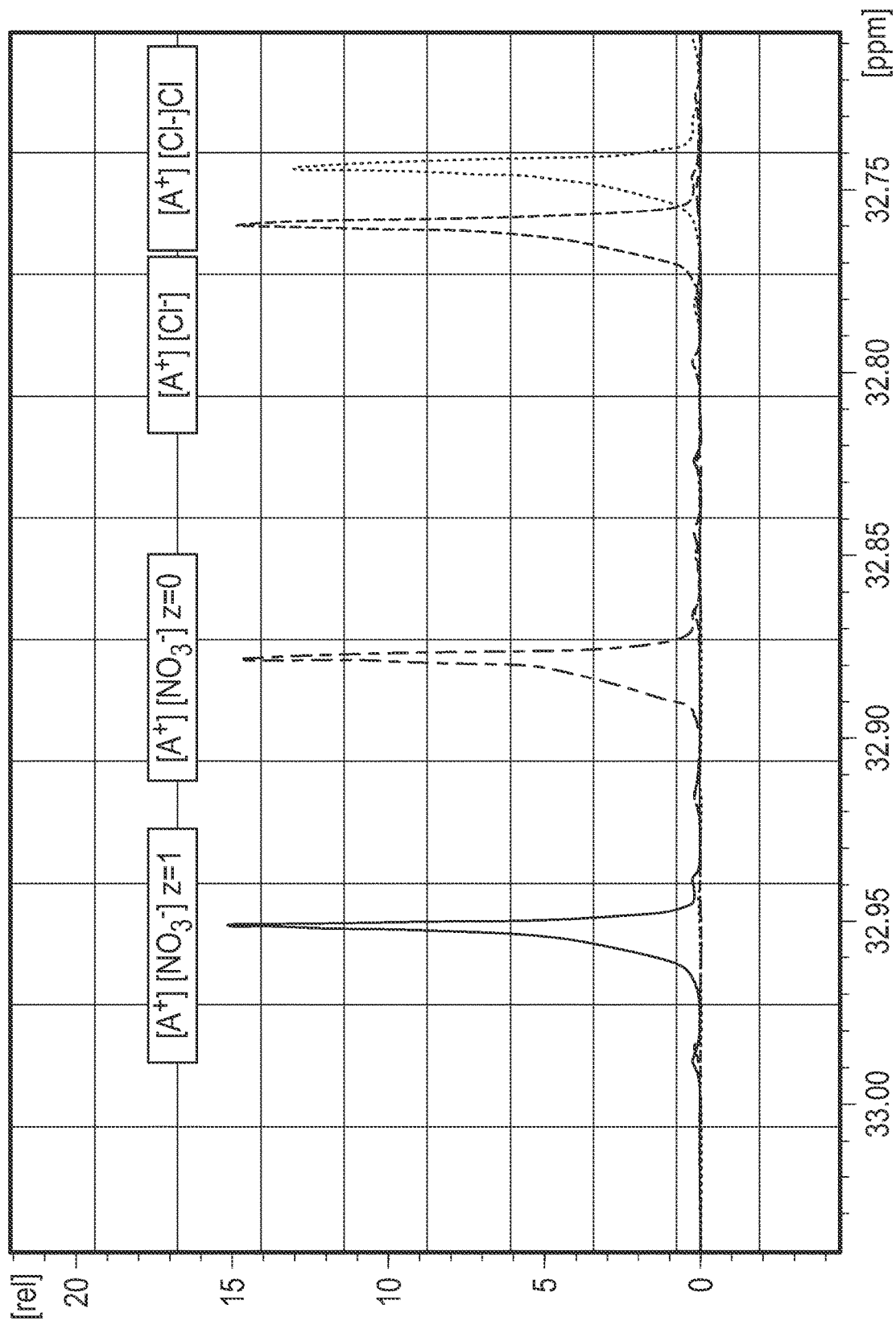

SEPARATION AND CONCENTRATION OF NITRATE FROM AQUEOUS SOLUTIONS AND GASEOUS STREAMS

CROSS-REFERENCE TO RELATED APPLICATIONS

This application is a National Stage application of International Patent Application No. PCT/IL2019/051331, filed on Dec. 5, 2019, which claims priority to U.S. Patent Application No. 62/775,932, filed on Dec. 6, 2018 each of which is hereby incorporated by reference in its entirety.

TECHNICAL FIELD

This application relates to separation and concentration of nitrate from aqueous solutions and gaseous streams.

BACKGROUND

Separation of nitrate from aqueous solutions of nitric acid or salts thereof, let alone from mixed-acid solutions (i.e., aqueous mixtures of nitric, sulfuric and hydrochloric acid, or their salts) is difficult to achieve. Major separation techniques such as solvent extraction (based on extractant-containing organic solvent which is mixed with the aqueous stream) and ion exchange (the aqueous stream is passed through a column loaded with a solid resin to replace the counter anion of the resin with ions from the aqueous solution) do not always enable nitrate separation with adequate sharpness, especially when competing anions are present in the aqueous solution.

Relatively little has been reported on the use of ionic liquids in connection with nitrate removal from aqueous streams. In GB 878244, a British patent dating back to the mid 1960-s, primary, secondary and tertiary amines as well as quaternary ammonium salt were tested for extracting nitrate from aqueous nitrate-sulfate solutions. The quaternary ammonium salt demonstrated in Table IV of GB 878244 is the ionic liquid dodecyl trimethyl ammonium chloride. It is worth mentioning that amine/ammonium salt were used in equimolar amount relative to the $HNO_3$ in the aqueous stream.

Kumari et al. [(Hydrometallurgy 165, vol. 165, Part 1, pages 159-165 (2016)] investigated the use of a phosphonium ionic liquid named Cyphos IL 104 [trihexyl(tetradecyl) phosphonium bis(2,4,4-trimethylpentyl) phosphinate] for solvent extraction of mineral acids; the ionic liquid was applied as extractant dissolved in kerosene. Another reference worth mentioning is U.S. Pat. No. 9,289,719, dealing with absorption and in-situ oxidation of nitric oxide from a gaseous stream, in the presence of water and oxygen, to form $HNO_3$, with the aid of water-miscible ionic liquids.

SUMMARY

In a series of patents (see U.S. Pat. Nos. 8,101,144, 9,114,360, 9,561,466 and WO 2017/216788) we described a technology for reducing the emission to the atmosphere of hazardous components present in flue gases produced in coal-fired power plants. With the aid of water-immiscible ionic liquid coupled to an oxidant, $Hg^0$, $SO_2$ and $NO_x$ are oxidized and absorbed by the ionic liquid and are thereby separated from the flue gas. To regenerate the ionic liquid, it is washed with water, with the intention to transfer the acids (e.g., $HNO_3$, $H_2SO_4$ and HCl) from the organic ionic liquid to the aqueous phase. However, we have found that the wastewater produced by treating the $HNO_3$, $H_2SO_4$ and HCl-loaded water immiscible ionic liquid with water contained surprisingly small amount of $HNO_3$.

This unusual finding has now led us to investigate the separability of $HNO_3$ from aqueous streams, in particular from mixed-acid solutions (i.e., mixtures of the strong acids) with the aid of nitrate ionic liquid of the type $[A^+][NO_3^-]$, where $A^+$ indicates an organic cation of water-immiscible ionic liquid. By "water immiscible ionic liquid" is meant an ionic liquid with solubility in water at room temperature of less than 5%, e.g., less than 1.0%, less than 0.1% and even down to 0.01% (w/w). We have found that nitrate ionic liquid $[A^+][NO_3^-]$ exhibits super-stoichiometric extraction of nitric acid/nitrate from aqueous solutions. Experimental work conducted in support of this invention indicates that on mixing water-immiscible ionic liquid of the formula $[A^+][NO_3^-]$ with $HNO_3$ aqueous stream, $HNO_3$ moves from the aqueous phase to the organic phase to an appreciable extent, achieving partition coefficient ($Kd_{HNO3}$) of roughly 1. Stated otherwise, we can achieve high load of $HNO_3$ in ionic liquid of the type $[A^+][NO_3^-]$.

Suitable ionic liquids are of the formula $[R_1R_2R_3R_4P^+][NO_3^-]$ or $[R_1R_2R_3R_4N^+][NO_3^-]$, i.e., phosphonium and ammonium salts, wherein $R_1$, $R_2$, $R_3$ and $R_4$ are the same or different and wherein at least two, or at least three of $R_1$, $R_2$, $R_3$ and $R_4$ are C5-C15 (preferably straight) alkyl groups. One useful example is $[(CH_3(CH_2)_5)_3P^+(CH_2)_{13}CH_3][NO_3^-]$ that is readily prepared from the corresponding (commercially available) chloride. Another example is $[(CH_3(CH_2)_7)_3N^+CH_3][NO_3^-]$, which can be obtained by repeatedly treating commercial trioctylmethyl ammonium chloride with nitrate solution to displace chloride by nitrate. The cationic portion of the ionic liquid may also be a heterocyclic ring (e.g., five or six membered ring) that contains one or more nitrogen atoms, e.g., imidazolium and pyridinium cations (see, for example, U.S. Pat. Nos. 9,114,360, 9,561,466 and WO 2017/216788).

We use a parameter Z to indicate $HNO_3$ load in the ionic liquid (Z is measured by acid-base titration). $[A^+][NO_3^-]_{z=0}$ refers to the case where essentially all of the positions of the counter anion in the ionic liquid are occupied by nitrate ion (e.g., not less than 95%, preferably not less than 98% of the available positions). But beyond that, no nitrate is associated with the ionic liquid. The position of the counter ion is named herein the "first position". Therefore, in the context of the present invention, $[A^+][NO_3^-]_{z=0}$ is an ionic liquid with zero load of $HNO_3$. One may view the $[A^+][NO_3^-]_{z=0}$ as the starting ionic liquid material. $[A^+][NO_3^-]_{z=0}$ ionic liquids are commercially available or can be prepared by known methods, for example, by vigorously mixing $[A^+][Hal^-]$ with an aqueous solution of a nitrate salt, thereby replacing the halide (e.g., chloride or bromide) with nitrate. The reaction mixture is then separated into organic and aqueous phases; the organic phase collected consists of an essentially chloride/bromide-free $[A^+][NO_3^-]_{z=0}$ ionic liquid which can be put to use in the present invention. But it should be borne in mind that $[A^+][NO_3^-]_{z=0}$ can be formed in situ, if the $HNO_3$-containing aqueous stream to be treated by the invention contains $HNO_3$ in molar excess relative to the initial $[A^+][Hal^-]$. After the complete displacement of halide by nitrate takes place, the resultant $[A^+][NO_3^-]_{z=0}$ can continue to capture $HNO_3$ from the aqueous stream to reach Z levels above zero.

By higher Z level we refer to the creation of $HNO_3$-loaded nitrate ionic liquid, wherein nitrate is associated with the ionic liquid beyond the first position, e.g., $[A^+][NO_3^-]_{0<Z\leq1}$ (indicating that the ionic liquid holds nitrate in addition to the positions occupied by the counter ions, up to one mole $HNO_3$) and even $[A^+][NO_3^-]_{1<z\leq2}$ (up to two moles $HNO_3$). Phosphorous-31 NMR spectroscopy shows that (i) replacing chloride with nitrate causes NMR peak shifting and (ii) addition of 1 mole of nitrate to ionic liquid of the type $[(CH_3(CH_2)_5)_3P^+(CH_2)_{13}CH_3][NO_3^-]$ to achieve z=1 nitrate loading leads to a further shifting of the peak in the NMR spectrum, suggesting an association of the added nitrate with the central phosphorous positively charged ion. In contrast, addition of chloride to ionic liquid of the type $[(CH_3(CH_2)_5)_3P^+(CH_2)_{13}CH_3][Cl^-]$ does not generate the same effect (see FIG. 13; instrument is Bruker AVII 500 MHz spectrometer; samples diluted in chloroform $CDCH_3$).

Another important observation that can be made based on the experimental results reported herein is that the partition coefficient $Kd_{HNO3}$ increases in the presence of other acids in the aqueous stream, such as $H_2SO_4$ and HCl, while on the other hand, the partition coefficients of these acids, $Kd_{H2SO4}$ and $Kd_{HCl}$, decrease with increasing concentrations of nitric acid in the organic phase. Consequently—quite surprisingly—the power of $[A^+][NO_3^-]_{z=0}$ to extract $HNO_3$ from aqueous streams increases with increasing concentrations of the competing anions sulfate and chloride. $[A^+][NO_3^-]_{z=0}$ can therefore be used to selectively separate nitrate from mixed-acidic aqueous streams. However, as shown below, the invention can be applied to serve other purposes.

In its most general form, the invention is directed to a process for recovering nitric acid or salts thereof, comprising:

contacting, in the presence of water, an water-immiscible ionic liquid of the formula $[A^+][X^-]$, wherein $[A^+]$ represents a phosphonium or ammonium cation and $[X^-]$ represents a counter anion which is $NO_3^-$, an halide anion displaceable by $NO_3^-$, or both, with a fluid that contains $HNO_3$ and at least one more mineral acid, or precursors of said acids, to partition, under mixing, said acids between aqueous and organic phases and form nitrate-loaded ionic liquid of the formula $[A^+][NO_3^-]_{z>0.25}$ where Z indicates a molar amount of nitrate held in the ionic liquid beyond the positions occupied by the nitrate counter ions;

separating the so-formed mixture into an organic phase comprising a nitrate-loaded ionic liquid $[A^+][NO_3^-]_{z>0.25}$ and an aqueous phase consisting of a nitrate-depleted aqueous solution that contains the other mineral acid(s);

stripping the nitric acid from said nitrate-loaded ionic liquid to create an aqueous nitrate solution and regenerate ionic liquid of the formula $[A^+][NO_3^-]_{z\geq0}$ with reduced nitrate loading, or unloaded $[A^+][NO_3^-]_{z=0}$ ionic liquid.

The one or more mineral acids, from which $HNO_3$ can be selectively separated by the process, include sulfuric acid, phosphoric acid and hydrohalic acids.

The ionic liquid $[A^+][X^-]$ with which the process begins is preferably $[R_1R_2R_3R_4P^+][X^-]$ wherein $R_1$, $R_2$, $R_3$ and $R_4$ are the same or different and wherein at least two $R_1$, $R_2$, $R_3$ and $R_4$ are C5-C15 alkyl groups and $[X^-]$ is chloride, bromide or nitrate. For example, $(CH_3(CH_2)_5)_3P^+(CH_2)_{13}CH_3][Cl^-]$ or $[(CH_3(CH_2)_5)_3P^+(CH_2)_{13}CH_3][NO_3^-]$.

The ionic liquid is loaded with nitrate to achieve $[A^+][NO_3^-]_{z>0.5}$, e.g., $[A^+][NO_3^-]_{z>0.75}$, $[A^+][NO_3^-]_{z>1.0}$, for example, $[A^+][NO_3^-]_{0.75<z<1.5}$.

The stripping of the nitrate from the ionic liquid to create an aqueous nitrate solution is achieved with the aid of a stripping reagent selected from the group consisting of water, an aqueous base solution, an aqueous salt solution, or a mixture thereof; or by heating the ionic liquid, optionally under reduced pressure, to release gaseous $HNO_3$ followed by absorption into an aqueous solution. The use of potassium hydroxide (or a mixture of potassium hydroxide and potassium nitrate) as a stripping agent would lead to formation of potassium nitrate and is especially preferred.

The invention is useful in industrial processes where selective nitrate separation from other acids is needed. For example, the invention can be incorporated into liquid-liquid extraction of nitrate from a fluid consisting of a mixed aqueous acidic solution (e.g., $HNO_3+H_2SO_4$ industrial water stream) to produce nitric acid or alkali nitrate. Another major application is concerned with a fluid which is an oxidized flue gas that contains $NO_2$ and $SO_2$, in which case the invention is applied for producing nitric acid or salts thereof by scrubbing the oxidized flue gas with the ionic liquid in the presence of an aqueous oxidizer to partition, under mixing, $HNO_3$ and $H_2SO_4$ between an aqueous phase and the organic phase to form nitrate-loaded ionic liquid of the formula $[A^+][NO_3^-]_{z>0.25}$.

Each of these two major uses of the invention shall now be described in more detail.

The invention can be applied for extraction of $HNO_3$ from mixed acidic solutions, as schematically illustrated in FIG. 10. The extraction takes place in numeral (1), for example, by using a mixer settler or any other extraction device to enable partition of the acids between the aqueous phase and the ionic liquid $[A^+][X^-]$ which is progressively loaded with the nitrate, turning into $[A^+][NO_3^-]_{z>0.25}$.

For example, a liquid-liquid extraction step can be carried out using a battery (or successively-arranged batteries) of mixer-settlers operating in a countercurrent fashion. A battery may include a single stage or multistage solvent extraction vessels (i.e., one or more mixer settlers). Briefly, the organic and aqueous phases are fed countercurrent to one another. Thus, the organic phase from the nth stage is fed to the "n+1" stage, while the aqueous phase from the nth stage is fed to the "n−1" stage. [O:A ratio is in the range from 1:100 to 100:1, e.g., from 1:10- to 10:1].

It should be pointed out that with the aid of $[A^+][NO_3^-]_{z\geq0}$ ionic liquid extractant, it is possible to achieve selective separation of nitrate from aqueous solutions (e.g., industrial water streams) which contain $HNO_3$ and at least a second mineral acid, for example, an aqueous solution comprising $HNO_3$ and one or more of the following acids: $H_2SO_4$, HX (X is halide, i.e., fluoride, chloride, bromide, or iodide) and $H_3PO_4$. The concentration of $HNO_3$ in the aqueous solution to be treated with the ionic liquid may vary from 0.05 to 60.0 wt % and the concentration of the other mineral acid(s) may vary from 0.1 to 70.0 wt %.

Following phase separation (not shown) into organic extract and aqueous raffinate, the organic extract, consisting of the nitrate-loaded ionic liquid, is circulated through a circulation line (2). A subsidiary organic stream that is diverted from the main circulation loop (2) is stripped (3), for example, with water or by neutralization with an aqueous alkaline (MOH) solution, or by evaporation of the $HNO_3$ and its capture in an aqueous form, to enable reuse of the unloaded ionic liquid [fed back to the extraction step through line (2)] and concentration of the nitrate, whereby the nitrate $MNO_3$ is collected in a separate tank (4); (M-cation such as alkali metal, e.g., K, or a proton). The aqueous raffinate (not shown) contains the "competitor" acid, e.g., $H_2SO_4$ and HCl. The design shown in FIG. 10 is merely illustrative; rather than diverting the main circulating stream to generate a side stream for stripping, it is possible to discharge the liquid from extraction battery and direct the stream for stripping etc.

More specifically, the invention provides process for producing nitric acid or nitrate salts by liquid-liquid extraction of nitrate from an aqueous stream that contains nitric acid and at least one more mineral acid, said process comprising the steps of:

an extraction step, which comprises contacting an extractant which is an water-immiscible ionic liquid of the formula $[A^+][X^-]$, wherein $[A^+]$ represents a phosphonium or ammonium cation and $[X^-]$ represents a counter anion which is $NO_3^-$, an halide anion displaceable by $NO_3^-$, or both, with an aqueous solution which contains $HNO_3$ and at least one more mineral acid, to partition, under mixing, said acids between aqueous and organic phases and form nitrate-loaded ionic liquid of the formula $[A^+][NO_3^-]_{z \geq 0.25}$ where Z indicates a molar amount of nitrate held in the ionic liquid beyond the positions occupied by the nitrate counter ions;

phase separation step, which comprises separating the so-formed mixture into an organic nitrate-loaded extract of the formula $[A^+][NO_3^-]_{z>0.25}$ and an aqueous raffinate comprising the other mineral acid(s);

a stripping step, which comprises stripping (e.g., by the methods described above) the nitric acid from said organic extract to create an aqueous nitrate solution and regenerate ionic liquid of the formula $[A^+][NO_3^-]_{z \geq 0}$ with reduced nitrate loading or unloaded $[A^+][NO_3^-]_{z=0}$ ionic liquid. Preferably, stripping of the $HNO_3$ from the loaded ionic liquid is achieved with potassium hydroxide or ammonium hydroxide, to produce valuable fertilizers.

The invention can be applied for separating $HNO_3$ from a mixture of acids formed during the scrubbing of $NO_2$-containing oxidized flue gas with the ionic liquid described herein. The competing acid in such cases may be $H_2SO_4$ (formed due to the oxidation of $SO_2$ frequently found in flue gases produced by power plants) or HCl (also frequently found in flue gases, and/or if oxidation of the flue gas is done with precursors thereof such as chlorine dioxide), as schematically illustrated in FIGS. 11 and 12.

A suitable apparatus for carrying out the gas purification and acids production is shown schematically in FIG. 11. The gas-liquid contactor (scrubber 1) is generally in the form of an absorption tower (for example, 10 to 30 m high tower with diameter of about 1-15 m). The incoming flue gas stream (F1) enters the tower through an inlet located at the bottom of the tower, e.g., in the lateral surface of the tower and flows upwardly, exiting the tower through an outlet located at the top of the tower (F2; clean gas). A suitable blower which operates at conventional throughputs, say, from 1,000 to 2,000,000 m³/hour is used to push the flue gas. A typical flue gas contains from about 100 to 4000 ppm sulfur dioxide and from about 50 to 3000 ppm NOR. Hence, the flow rates of $SO_2$ and NOR into the tower are expected to be 0.02-1000 kg/hr. Optionally, the flue gas is passed through a heat exchanger before it enters the tower, to reduce its temperature to less than 150° C., e.g., to about 40-100° C.

It should be noted that the incoming gas stream (F1) undergoes oxidation before it enters the scrubber (1), using a first oxidizer, e.g., a gaseous oxidizer such as chlorine dioxide, ozone, molecular chlorine, to transform $NO_x$ to $NO_2$. For example, it is convenient to inject the gaseous oxidizer into the incoming flue gas stream just before it enters the tower, to produce a combined flue gas/oxidizer stream.

A second oxidizer, in an aqueous form, e.g., aqueous solution of hydrogen peroxide, is fed via a separate feed line (F3) to the gas-liquid contactor. A supply of 0.05 to 10000 kg/hr would generally satisfy the requirements of the chemical reactions taking place in the reactor (oxidation of metal pollutant and other pollutants such as $SO_2$ and $NO_x$).

One preferred design (wet scrubber) which is known to achieve good contact between a flue gas and liquid absorbent (i.e., the ionic liquid in the present case) consists of a countercurrent-flow spray (optionally packed) tower, in which the liquid stream is supplied through an inlet located at the top of the tower, and is distributed in the internal space of the tower with the aid of one or more spray heads or an array of nozzles mounted within the tower. The upwardly moving gas is exposed to the liquid stream that flows in the opposite direction, resulting in capturing the oxidized forms of the pollutants by the ionic liquid.

The ionic liquid is withdrawn from the bottom of the tower and is led via a primary circulation loop (2) back to the top of the tower. The liquid flow rate is generally from 1 to 500 m³/hour, for example, about 100 m³/hour.

Primary circulation loop (2) splits to a secondary circulation loop (3) provided with a first separation unit (4) and a second separation unit (5). These units can be activated when the emission of $SO_2$ and $NO_x$ from the top of the tower exceeds a predetermined threshold, indicating that the ionic liquid is fairly loaded and needs to be regenerated. Alternatively, the ionic liquid passing in circulation loop (2) can be periodically sampled to measure its loading level (i.e., the Z value is measurable by acid-base titration). When $SO_2$ and $NO_x$ emissions are unacceptable or when Z exceeds a predetermined threshold, the stream of the ionic liquid is directed from the primary circulation loop (2) to the secondary circulation loop (3). The flow rate in the secondary circulation loop (3) is about 0.01 to 60, e.g., around 1 m³/hour.

It should be noted that a design based on the diverting a secondary stream through loop (3) from main loop (2) is not mandatory. An alternative arrangement consists of discharging the loaded scrubbing liquid from the bottom of scrubber (1) via a main discharge line and treating it as described below.

In separation unit (4), the ionic liquid-containing stream (F4) discharged from the scrubber is optionally mixed with water stream (F5), supplied at a flow rate of 0.001 to 10 m³/hour, e.g., about 0.05 m³/hour. It should be noted that water stream (F5) is optional because stream (F4) contains water to some extent, owing to the presence of $H_2O$ vapors is the flue gas and the use of aqueous oxidizer (F3).

Following phase separation in separation unit (4), an aqueous solution which contains the washable acids, that is, $H_2SO_4$ or mixed $H_2SO_4$ and HCl acidic stream (e.g., at weight ratio of about 3:2-1000:1) is withdrawn and led via line (F6) to a treatment chamber, e.g., either an distillation unit (not shown), to recover $H_2SO_4$-rich, HCl-depleted aqueous stream (e.g., at weight ratio of about 25:1-30:1) or neutralization reactor (not shown), to recover salt mixture upon addition of aqueous hydroxide (stream (F6) may be contacted with fresh ionic liquid to remove remnant nitrate prior to recovery of the other acids).

The organic phase that is discharged from separation unit (4) flows (F7) to separation unit (5); stream (F7) may be contacted with water to remove remnant $H_2SO_4$. The organic phase consists of the nitrate-loaded ionic liquid and the mercury which is solubilized in the organic phase. An aqueous potassium hydroxide solution (F9) which is fed to separation unit (5) is used to strip the nitrate from the nitrate-loaded ionic liquid. Following phase separation in separation unit (5), an aqueous solution which contains potassium nitrate is formed (F10) owing to the neutralization of $HNO_3$ with KOH. $KNO_{3(aq)}$ is guided (F11) to a crystallizer (6), to separate crystalline potassium nitrate (F13). The filtrate (F12) is combined with stream F10.

The organic phase, which consists of the $[A^+][NO_3^-]_{z\geq 0}$ with reduced nitrate load, preferably the unloaded $[A^+][NO_3^-]_{z=0}$, is directed (F8) via secondary circulation loop (3) back to the gas-liquid contactor (1).

Accordingly, another aspect of the invention is a process for producing nitric acid or salts thereof by removing $NO_x$ from a flue gas, said process comprising the steps of:

passing an oxidized flue gas stream that contains $NO_2$ and $SO_2$ through a gas-liquid contactor, where the flue gas is brought into intimate contact with an water-immiscible ionic liquid of the formula $[A^+][X^-]$, wherein $[A^+]$ represents a phosphonium or ammonium cation and $[X^-]$ represents a counter anion which is $NO_3^-$, an halide anion displaceable by $NO_3^-$, or both, in the presence of an aqueous oxidizer, and form nitrate-loaded ionic liquid of the formula $[A^+][NO_3^-]_{z>0.25}$ where Z indicates a molar amount of nitrate held in the ionic liquid beyond the positions occupied by the nitrate counter ions;

releasing a purified flue gas to the atmosphere;

withdrawing ionic liquid-containing stream from the gas-liquid contactor and feeding regenerated ionic liquid stream back into the gas-liquid contactor through a circulation loop, wherein the ionic liquid-containing stream flows through said circulation loop where it is subjected to regeneration treatment comprising the steps of:

separating the ionic liquid-containing stream, optionally after addition of water, into a first organic stream consisting essentially of $H_2SO_4$-free and HX-free ionic liquid $[A^+][NO_3^-]_{z>0.25}$ and a first aqueous acidic stream which contains $H_2SO_4$ and optionally HX, wherein X is halide;

stripping the nitrate from the organic stream consisting of the ionic liquid $[A^+][NO_3^-]_{z>0.25}$ to create a second aqueous stream which contains $HNO_3$ or salt thereof; and regenerating ionic liquid of the formula $[A^+][NO_3^-]_{z\geq 0}$ with reduced nitrate loading (i.e., reduced Z value), or unloaded $[A^+][NO_3^-]_{z=0}$ ionic liquid;

leading said $[A^+][NO_3^-]_{z\geq 0}$ with reduced Z value back to the gas-liquid contactor; and recovering $H_2SO_4$ solution from said first aqueous acidic stream and optionally HX solution, wherein X is halide, or salts thereof, and from the second aqueous stream a nitrate salt or nitric acid solution.

FIG. 12 shows another variant of a process for producing nitric acid or salts thereof by removing $NO_x$ from an incoming stream of flue gas (F1) led to scrubber (1). (F2) indicates the purified gas stream released to the atmosphere. Note that oxidation is achieved solely with gaseous chlorine dioxide (F3) injected into the incoming flue gas (F1). Primary circulation loop (2), i.e., the circulation loop of the loaded ionic liquid (e.g., Z>1) splits to a secondary circulation loop (3) provided with a first separation unit (4) and a second separation unit (5), which operate akin to the previously described design of FIG. 11, to selectively remove water-washable acids (but not $HNO_3$) from the loaded ionic liquid, and ultimately collecting nitric acid or salts thereof in tank (6).

Owing to the use of $ClO_2$ as the oxidizer, HCl is present alongside $H_2SO_4$ in the aqueous acidic stream (20). The mixed aqueous acidic stream is treated to recover the acids separately, i.e., separation of HCl by evaporation process to obtain concentrated HCl (21) and simultaneously collecting the concentrated acids that did not evaporate, e.g., $H_2SO_4$, in a separate tank (22).

It should be noted that the processes of the invention are essentially devoid of water immiscible organic solvents (e.g., kerosene and the like; such solvents are commonly used in liquid-liquid extraction). That is, the ionic liquid of the invention is undiluted with added organic solvents. By the term "ionic liquid that is essentially devoid of organic solvent", or "undiluted ionic liquid", is meant that the amount of added organic solvent can be up to 20% by weight, e.g., less than 10% by weight, less than 5% by weight and preferably less than 1% by weight relative to the amount of the ionic liquid, e.g., from 0 to 0.3%. However, it is also possible to use organic solutions in which the ionic liquid extractant is blended with aliphatic or aromatic hydrocarbons solvents (e.g., decane, cyclohexane, xylene). The ionic liquid is preferably the predominant component in such solutions, e.g., it consists from 50 to 80 wt % based on the total weight of the organic solution.

A further useful utility of the enhanced affinity displayed by $[A^+][NO_3^-]_{z=0}$ towards nitrate in the presence of sulfate or chloride, in comparison with the affinity of said ionic liquid towards nitrate in dilute $HNO_3$ solutions, is the formation of concentrated nitrate solution. That is, following the extraction, acids-depleted aqueous solution and acids ($HNO_3$)-loaded ionic liquid are obtained. The latter can be mixed with water, to wash out all acids other than nitric acid, which remains in association with the ionic liquid. Next, stripping of the $HNO_3$-loaded ionic liquid is readily achievable with the aid of fresh water, a salt solution, a base solution (e.g., potassium hydroxide) or upon heating and/or under reduced pressure, to produce a concentrated nitrate solution that can be used in the manufacture of fertilizers, as shown in detail below.

Another aspect of the invention is therefore a liquid-liquid extraction process for separating nitrate from dilute aqueous solution of nitric acid or salts thereof (with initial nitrate concentration $C_i \geq 0.01\%$) and produce concentrated aqueous solution of nitric acid or salts thereof (e.g., arriving at final nitrate concentration $C_f$ which is at least twofold greater than $C_i$, preferably one magnitude of order greater than $C_i$), which comprises:

contacting said dilute aqueous nitrate solution with water-immiscible ionic liquid of the formula $[A^+][X^-]$, wherein $X^-$ is $NO_3^-$ or an anion displaceable by $NO_3^-$ (e.g., $X^-$ is an inorganic anion such as halide, e.g., chloride), generating nitrate-loaded ionic liquid $[A^+][NO_3^-]_{z>0}$, preferably $[A^+][NO_3^-]_{z>0.25}$, more preferably $[A^+][NO_3^-]_{z>0.5}$, e.g., $[A^+][NO_3^-]_{z>0.75}$, most preferably $[A^+][NO_3^-]_{z>1.0}$, stripping the nitrate from said nitrate-loaded ionic liquid (e.g., with the aid of water, an aqueous salt solution, or an aqueous base solution to liberate nitrate into an aqueous solution; or by heating and/or under reduced pressure to release gaseous $HNO_3$ followed by absorption into an aqueous solution), to create a concentrated solution thereof and regenerate an ionic liquid of the formula $[A^+][NO_3^-]_{z\geq 0}$ with lesser nitrate loading, or unloaded [A$^+$][NO$_3^-$]$_{z=0}$ ionic liquid. Preferably, the stripping is achieved with an aqueous base which is potassium hydroxide or ammonium hydroxide, to produce valuable fertilizers.

BRIEF DESCRIPTION OF THE DRAWINGS

FIG. 13 is Phosphorous-31 NMR spectrum of ionic liquids described herein.

DETAILED DESCRIPTION

Figure 1:
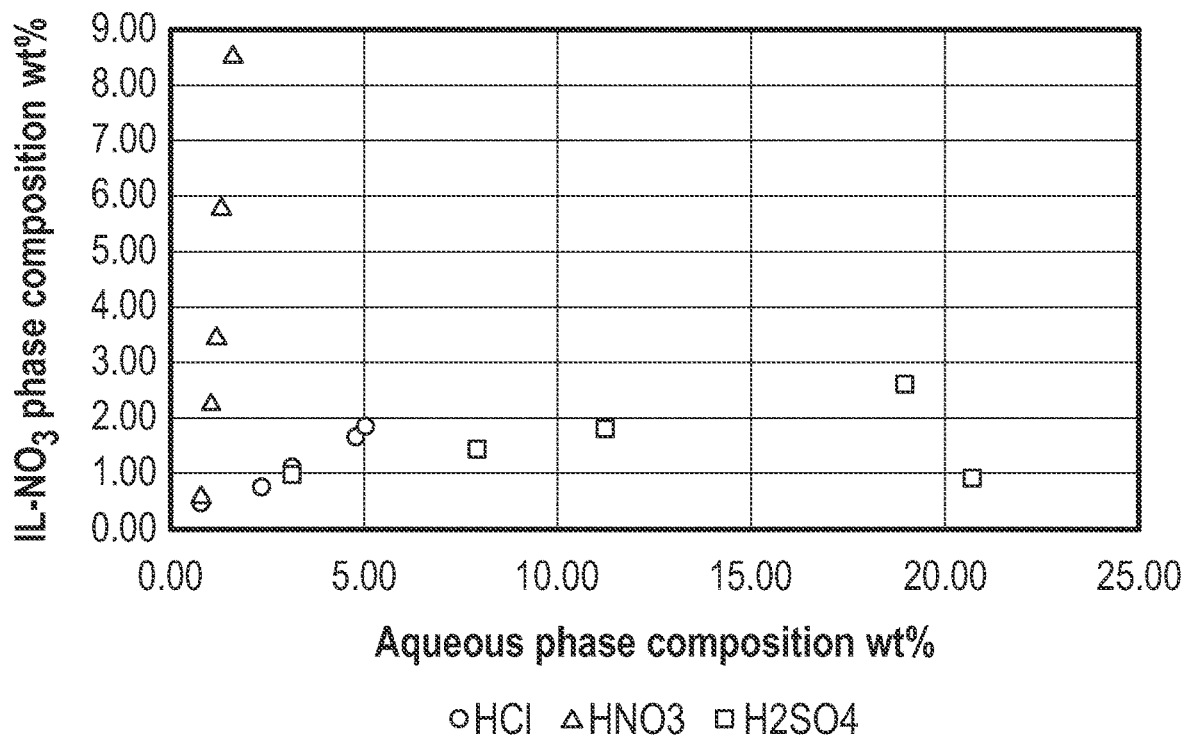
FIG. 1 shows results of HNO$_3$ extraction from aqueous HNO$_3$+H$_2$SO$_4$+HCl mixture.

Trihexyl(tetradecyl)phosphonium chloride (CYPHOS IL-101) was purchased from Holland Moran, Israel. Potassium chromate K$_2$CrO$_4$, Phenolphthalein and Sodium hydroxide solution (0.1 N) were purchased from Sigma-Aldrich, Israel. Silver nitrate solution (AgNO$_3$) 2.5% (w/v) was purchased from Sigma-Aldrich, Israel. Potassium fluoride was purchased from Merck Israel. Mercury chloride and aliquat336 were purchased from Sigma-Aldrich, Israel. phosphoric acid 85% solution was purchased from Sigma-Aldrich, Israel. Decane was purchased from Sigma-Aldrich, Israel.

Preparation 1
Preparation of nitrate ionic liquid (IL-NO$_3$)

15 gr of Trihexyl(tetradecyl)phosphonium chloride and 17 gr of KNOB (10% solution) were mixed at 98° C. for 5 minutes, then left for 20 minutes in order to enable phase separation. The clear aqueous phase (the lower level phase) was removed and fresh 17 gr KNO$_3$ (10% solution) was added. The mixture was stirred at 98° C. for 5 minutes. After phase separation the clear aqueous phase was removed. Fresh 17 gr KNO$_3$ 10% solution was added, and the mixture was stirred at 98° C. for 5 minutes. After phase separation the clear organic liquid was collected. To determine that chloride ions were fully displaced by the nitrate, the ionic liquid was analyzed for the presence Cl. The chloride (Cl$^-$) concentration was determined using standard AgNO$_3$ (0.05 N with indicator 5% K$_2$CrO$_4$) titration. The Cl concentration in the resultant ionic liquid solution was 0.02 mol/kg, indicating that 99% of the Cl ions were replaced by NO$_3$.

The nitrate ionic liquid that was obtained is named hereinafter IL-NO$_3$.

Preparation 2
Preparation of Nitrate Ionic Liquid (aliquat336-NO$_3$)

10 gr of Trioctylmethylammonium chloride (Aliquat® 336) and 25 gr of KNO$_3$ (10% solution) were mixed at 80° C. for 5 minutes, then left for 20 minutes to enable phase separation. The clear aqueous phase (lower phase) was removed and fresh 25 gr KNO$_3$ (10% solution) was added. The mixture was stirred at 80° C. for 5 minutes. After phase separation the clear aqueous phase was removed. Fresh 25 gr KNO$_3$ 10% solution was added, and the mixture was stirred at 80° C. for 5 minutes. After phase separation the clear organic liquid was collected. To determine that chloride ions were fully displaced by the nitrate, the ionic liquid was analyzed for the presence Cl. The chloride (Cl$^-$) concentration was determined using standard AgNO$_3$ (0.05 N with indicator 5% K$_2$CrO$_4$) titration. The Cl concentration in the resultant ionic liquid solution was 0.035 mol/kg, indicating that 98.6% of the Cl ions were replaced by NO$_3$ ions.

The nitrate ionic liquid that was obtained is named hereinafter aliquat336-NO$_3$.

Example 1

Separation of Nitric Acid from a Mixture of Strong Acids with IL-NO$_3$

A series of experiments (1-6) were made to measure the distribution of HNO$_3$, HCl and H$_2$SO$_4$ with the ionic liquid of Preparation 1 (IL-NO$_3$). To this end, Solution A1 (consisting of 6.9 wt % HNO$_3$, 21.1 wt % H$_2$SO$_4$ and 6.4 wt % HCl in water), IL-NO$_3$ and water were mixed at various proportions set out in Table 1, using a vortex mixer for 5 minutes at 98° C.

TABLE 1

| experiment number | solution A1 (gr) | water (gr) | IL-NO$_3$ (gr) |
|---|---|---|---|
| 1 | 0.1014 | 0.478 | 0.333 |
| 2 | 0.1676 | 0.2312 | 0.2838 |
| 3 | 0.2140 | 0.1486 | 0.2653 |
| 4 | 0.3305 | 0 | 0.285 |
| 5 | 0.5164 | 0 | 0.2836 |

In all cases, the resultant liquid consists of a clear IL-NO$_3$ phase and aqueous phase. Concentrations of the three acids were determined as follows:

[H$^+$] was determined separately in each phase by titration with standard sodium hydroxide (0.1 N solution using Phenolphthalein indicator).

[Cl$^-$] was determined separately in each phase using the standard AgNO$_3$ (0.05 N with indictor 5% K$_2$CrO$_4$) titration.

[NO$_3$] in the aqueous phase was measured by NO$_3$ electrode (Nitrate Ion Meter NO3-11 electrode from HORIBA).

[NO$_3$] in the IL-NO$_3$ was calculated by mass balance (NO$_3$(IL)=NO$_3$(tot))-NO$_3$(aqua).

[SO$_4$] in the IL-NO$_3$ was calculated by the difference between H$^+$ and the Cl$^-$ and NO$_3^-$ concentration.

[SO$_4$] in the aqueous phase was calculated by mass balance.

The distribution coefficient is defined by the ratio $[Y]_{IL{\text -}NO_3}/[Y]_{aqueous\ phase}$; Y indicates the acid under consideration.

The selectivity constant is defined by the ratio:
$[Y1]_{IL{\text -}NO_3}/[Y1]_{aqueous\ phase} : [Y2]_{IL{\text -}NO_3}/[Y2]_{aqueous\ phase}$
where Y1 and Y2 indicate a pair of acids under consideration.

The results are tabulated in Table 2 and are also presented graphically in FIG. 1.

TABLE 2

| Aqueous phase composition | | | IL-NO$_3$ phase composition | | | Distribution coefficient | | | Selectivity constant | |
|---|---|---|---|---|---|---|---|---|---|---|
| HCl wt % | HNO$_3$ wt % | H$_2$SO$_4$ wt % | HCl wt % | HNO$_3$ wt % | H$_2$SO$_4$ wt % | HCl Kd | HNO$_3$ Kd | H$_2$SO$_4$ Kd | HNO$_3$/ HCl | HNO$_3$/ H$_2$SO$_4$ |
| 0.75 | 0.76 | 3.2 | 0.44 | 0.61 | 0.88 | 0.59 | 0.80 | 0.27 | 1.4 | 2.9 |
| 2.41 | 1.04 | 7.9 | 0.71 | 2.28 | 1.40 | 0.29 | 2.19 | 0.18 | 7.5 | 12.4 |
| 3.17 | 1.17 | 11.2 | 1.07 | 3.52 | 1.77 | 0.34 | 3.00 | 0.16 | 8.9 | 19.0 |
| 5.09 | 1.33 | 18.9 | 1.80 | 5.82 | 2.61 | 0.35 | 4.39 | 0.14 | 12.4 | 31.9 |
| 4.74 | 1.65 | 20.7 | 1.63 | 8.55 | 0.94 | 0.34 | 5.18 | 0.05 | 15.0 | 114.2 |

The abscissa and ordinate of each point in the graph are: $\{[Y]_{aqueous\ phase}; [Y]_{IL{\text -}NO_3}\}_i$, where $[Y]_{aqueous\ phase}$ indicates the concentration of the acid in the aqueous phase and $[Y]_{IL{\text -}NO_3}$ indicates the concentration of the acid in the ionic liquid for each of the six experiments (i=1, 2, 3, 4, 5, 6), based on the data tabulated in Table 2. From the results one can see that the distribution coefficient of HNO$_3$ is surprisingly very high relative to the distribution coefficients of H$_2$SO$_4$ and HCl between IL-NO$_3$ phase and the aqueous phase. The extraction of nitric acid by the ionic liquid is very efficient even at low HNO$_3$ concentration. The efficiency of HNO$_3$ extraction in diluted HNO$_3$ solutions is surprisingly good, bearing in mind the high solubility of nitrate in water. It is also seen that HCl and the H$_2$SO$_4$ distribution coefficients decrease with increasing NO$_3$ loading onto IL-NO$_3$. That is, when the ionic liquid is fully loaded with HNO$_3$ in the second position (Z>1-NO$_3$—NO$_3$ loading).

Example 2

Separation of HNO$_3$ from Dilute Nitric Acid Solution Using IL-NO$_3$

A Series of Experiments were Made to Measure the Distribution of HNO$_3$ between IL-NO$_3$ and aqueous phase. To this end, 50% HNO$_3$ solution, water and IL-NO$_3$ were mixed at various proportions set out in Table 3 using a vortex mixer for 5 minutes at 98° C.

TABLE 3

| HNO$_3$ 50% solution (gr) | Water (gr) | IL-NO$_3$ (gr) |
|---|---|---|
| 0.040 | 1.46 | 1 |
| 0.037 | 1.46 | 1 |
| 0.053 | 1.45 | 1 |
| 0.16 | 1.34 | 1 |
| 1.46 | 0.04 | 1 |
| 1.18 | 0.32 | 1 |
| 0.71 | 0.79 | 1 |
| 0.53 | 0.97 | 1 |
| 0.31 | 1.19 | 1 |

In all cases, the resultant liquid consists of a clear IL-NO$_3$ phase and aqueous phase. Both phases were analyzed for H+ by titration with standard sodium hydroxide (0.1 N solution using phenolphthalein indicator). The results are shown in Table 4 and in FIGS. 2 and 3.

TABLE 4

| Aqueous phase | IL-NO$_3$ Phase | | Distribution |
|---|---|---|---|
| HNO$_3$ Wt % | HNO$_3$ Wt % | Z | coefficient IL-NO$_3$\Aqua |
| 0.73 | 0.75 | 0.059 | 1.02 |
| 0.78 | 0.82 | 0.065 | 1.06 |
| 1.12 | 0.99 | 0.078 | 0.89 |
| 3.5 | 2.81 | 0.225 | 0.8 |
| 5.5 | 7.03 | 0.589 | 1.27 |
| 10.6 | 10.6 | 0.922 | 1 |
| 15.9 | 11.5 | 1.011 | 0.72 |
| 29.3 | 15.2 | 1.4 | 0.52 |
| 37.4 | 17 | 1.601 | 0.46 |

Figure 3:
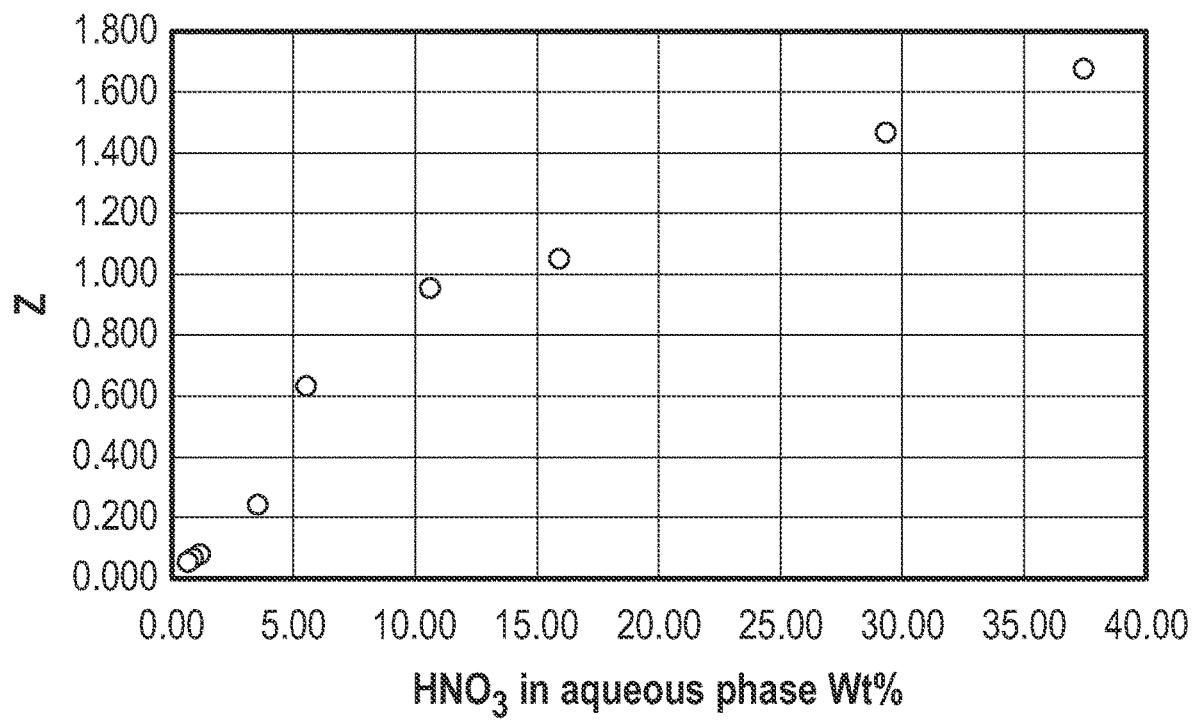
FIG. 3 shows results of HNO$_3$ extraction from HNO$_3$ stream.

The abscissa and ordinate of each point in the graph (the first and second coordinates of a point) are:
$\{[HNO_3]_{aqueous\ phase}; [HNO_3]_{IL{\text -}NO_3}\}_i$, where $[HNO_3]_{aqueous\ phase}$ indicates the concentration of the acid in the aqueous phase and $[HNO_3]_{IL{\text -}NO_3}$ indicates the concentration of the acid in the ionic liquid for each of the nine experiments (i=1, 2, 3, 4, 5, 6, 7, 8, 9), based on the data tabulated in Table 3. FIG. 3 is Z versus concentration $[HNO_3]_{aqueous\ phase}$ plot.

Example 3

Separation of Nitric Acid from Aqueous Phase Using IL-NO$_3$ that is Formed in Situ from IL-Cl Experiment was carried out to measure the distribution of HNO$_3$ with IL-Cl. To this end, 0.85 gr 5.6% HNO$_3$ solution and 0.3274 gr Trihexyl(tetradecyl)phosphonium chloride (IL-Cl) were mixed using a vortex mixer for 5 minutes at 98° C. The resultant liquid consists of a clear ionic liquid phase and aqueous phase. Both phases were analyzed in order to determine acids concentration in different phases. The results are shown in Table 5.

TABLE 5

| Aqueous phase composition | | IL-Cl phase composition | | | | | | | |
|---|---|---|---|---|---|---|---|---|---|
| $HNO_3$ wt % | HCl wt % | HCl mol/kg | HCl wt % | $HNO_3$ wt % | $HNO_3$ mol/kg | H+ mol/kg | NO3/IL Mol/mol | Cl/IL Mol/mol | Selectivity $HNO_3$/Cl |
| 0.63 | 2.60 | 0.33 | 1.2 | 11.3 | 1.8 | 0.33 | 1.071 | 0.197 | 39.4 |

It is noted that the $NO_3^-$/IL molar ratio is more than 1, indicating Z>0.

Example 4

Stripping of Nitric Acid from $HNO_3$-Loaded IL-$NO_3$ by Evaporation Process

Separation of $HNO_3$ from $HNO_3$-loaded IL-$NO_3$ was achieved by bubbling $N_2$ through the ionic liquid at 98° C. or 155° C. $N_2$ 30 ml/min was bubbled through 2.83 gr IL-$NO_3$ $_{z=1.1}$ at 98° C. or 155° C. Samples were taken from the nitrate-loaded ionic liquid at different times over a period of 280 minutes and analyzed for H+ by titration with standard sodium hydroxide. The results are set out in Table 6 and presented graphically in FIG. 4.

TABLE 6

| Time(min) | Z 98° C. | Z 155° C. |
|---|---|---|
| 0 | 1.12 | 0.89 |
| 20 | 1.07 | |
| 40 | | 0.20 |
| 50 | 1.04 | |
| 90 | 0.92 | |
| 130 | 0.88 | |
| '150 | | 0.17 |
| 180 | 0.90 | |
| 280 | 0.89 | |

Figure 4:
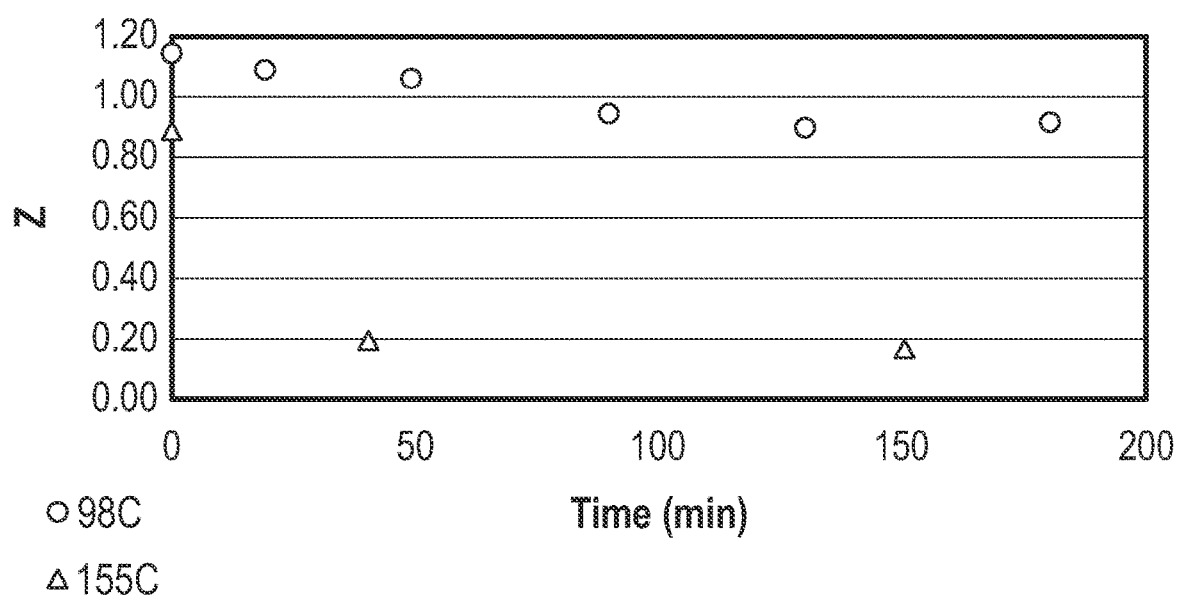
FIG. 4 illustrates HNO$_3$ stripping results from loaded ionic liquid at different temperatures.

Z versus time plot shown in FIG. 4 indicates that $HNO_3$ is readily separable from the ionic liquid at increased temperature (T=155° C.).

Example 5

Stripping of $HNO_3$ from $HNO_3$-Loaded [IL-$NO_3$]$_{z=1.01}$ Using $NaHCO_3$ Solution The stripping of $HNO_3$ from loaded IL-$NO_3$ was achieved with the aid of a base. 0.415 gr $HNO_3$-loaded IL-$NO_3{_{3z=1.01}}$ and 0.263 gr $NaHCO_3$ solution (20.3 wt %) were mixed using a vortex mixer for 5 minutes at 98° C. Then the ionic liquid was analyzed for H+ by titration with standard sodium hydroxide. The results are shown in Table 7.

TABLE 7

| Initial condition | | | IL- $NO_3$ phase composition after stripping | |
|---|---|---|---|---|
| IL-$NO_3$ wt % | Z | $NaHCO_3$/$HNO_3$ mole/mole | $HNO_3$ in IL- $NO_3$ wt % | Z |
| 12.6 | 1.01 | 0.8 | 2.5 | 0.203 |

Nitrate is effectively stripped from the ionic liquid by sodium bicarbonate alkaline solution. Note that the ionic liquid was present in molar excess relative to the bicarbonate, and hence Z was reduced from 1.01 to 0.203. But with the aid of larger amount of $NaHCO_3$ full stripping could have been achieved.

Example 6

Stripping of $HNO_3$ from $HNO_3$-Loaded [IL-$NO_3$]$_{Z=1.01}$

The stripping of $HNO_3$ from loaded IL-$NO_3$ was achieved with the aid of an alkaline potassium nitrate solution (stripping solution consisting of KOH 2 wt % in 25 wt % $KNO_3$ solution).

0.8428 gr [IL-$NO_3$]$_{z=1.01}$ and 4.087 gr of a solution composed of 25% $KNO_3$+2.13 wt % KOH were mixed using a vortex mixer for 5 minutes at 98° C. The resultant clear organic and aqueous phases were analyzed for H+ by titration with standard sodium hydroxide. The results are shown in Table 8.

TABLE 8

| IL-$NO_3$ phase composition | | Aqua phase composition | |
|---|---|---|---|
| $HNO_3$ wt % | Z | $HNO_3$ wt % | $KNO_3$ wt % |
| 1.0 | 0.080875 | 0.02 | 28.8 |

The stripping reaction that liberates the $HNO_3$ from the ionic liquid and transforms it into potassium nitrate solution is:

IL-$NO_3$-$HNO_3$+KOH→IL-$NO_3$+$KNO_3$+$H_2O$

The extraction of $HNO_3$ from the IL-$NO_3$ phase with KOH solution is very efficient. The aqueous solution obtained after the extraction is at natural pH.

Example 7

Figure 5:
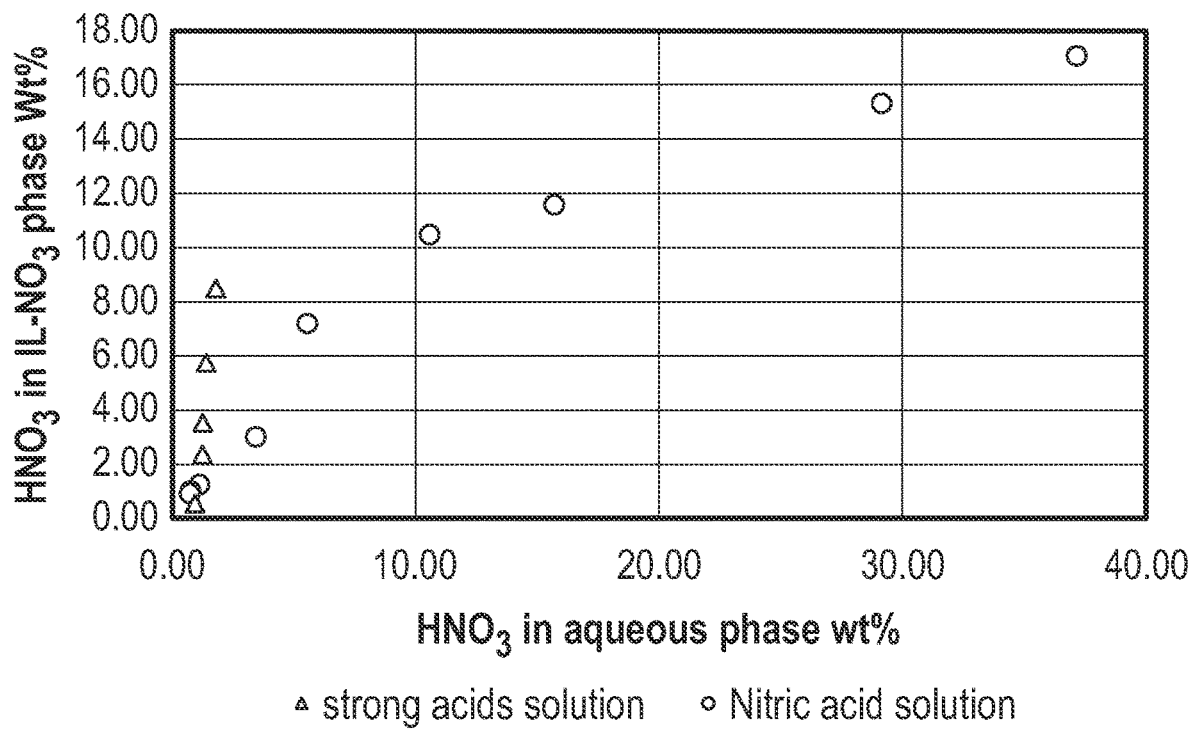
FIG. 5 shows the results of Examples 1 and 2 together.

Extraction of Nitric Acid from a Mixture of Strong Acids and Stripping into Aqueous Phase at Higher Concentration FIG. 5 emphasizes an important finding emerging from the results reported in Example 1 (extraction of $HNO_3$ from an aqueous mixture of acids with the aid of the ionic liquid) and Example 2 (separation of $HNO_3$ from $HNO_3$ aqueous stream).

The coordinates of the triangle points are:
{[$HNO_3$]$_{aqueous\ phase}$; [$HNO_3$]$_{IL-NO3}$}$_i$, where [$HNO_3$]$_{aqueous\ phase}$ indicates the concentration of $HNO_3$ in the aqueous phase and [$HNO_3$]$_{IL-NO3}$ indicates the concentration of $HNO_3$ in the ionic liquid for each of the six experiments (i=1, 2, 3, 4, 5, 6), based on FIG. 1, which is related to the separation of $HNO_3$ from a mixture of strong mineral acids ($HNO_3$+$H_2SO_4$+HCl mixture).

Figure 2:
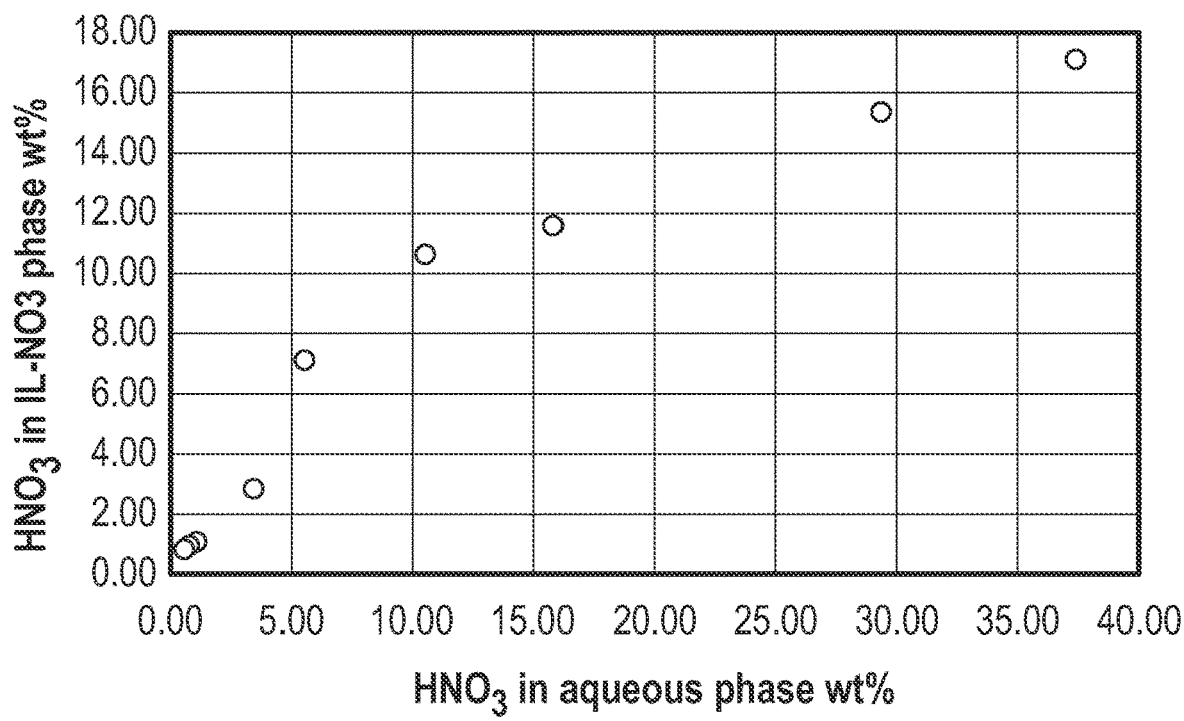
FIG. 2 shows results of HNO$_3$ extraction from HNO$_3$ stream.

The coordinates of the circle points are:
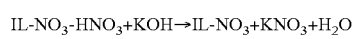
{[$HNO_3$]$_{aqueous\ phase}$; [$HNO_3$]$_{IL-NO3}$}$_j$, where [$HNO_3$]$_{aqueous\ phase}$ indicates the concentration of $HNO_3$ in the aqueous phase and [$HNO_3$]$_{IL-NO3}$ indicates the concentration of $HNO_3$ in the ionic liquid for each of the nine experiments (i=1, 2, 3, 4, 5, 6, 7, 8, 9), based on FIG. 2, which is related to the separation of $HNO_3$ from dilute $HNO_3$ stream.

It is seen that the partition coefficient of nitric acid $Kd_{HNO3}$ increases in the presence of other acids in the aqueous stream from which $HNO_3$ is to be removed, as indicated by the sharp slope of the curve formed by triangle points. On the other hand, $Kd_{HNO3}$ measured for the series of experiments in which $HNO_3$ was extracted from aqueous stream devoid of other acids is roughly 1. Consequently, one can benefit from the enhanced affinity displayed by $[A^+]$ $[NO_3^-]_{z=0}$ towards nitrate in the presence of sulfate or chloride, in comparison with the ability of the ionic liquid to capture nitrate from dilute $HNO_3$ solutions, by loading the ionic liquid with nitrate from a first aqueous solution consisting of a mixed acidic solution, reaching an equilibrium state wherein $[HNO_3]_{IL\text{-}NO3} \gg [HNO_3]_{first\ aqueous\ solution}$, and after removal of the readily washable acids ($H_2SO_4$, HCl) from the ionic liquid (if needed), stripping the nitrate from the ionic liquid to release $HNO_3$ into a second aqueous solution. That is, moving from a point in the 'triangle curve' horizontally to a point on the 'circles curve' to create a second aqueous solution characterized in that the $[HNO_3]_{second\ aqueous\ solution} \gg 1 [HNO_3]_{first\ aqueous\ solution}$.

Example 8

Separation of Nitric Acid from Aqueous Mixtures of $HNO_3$ and Varying Concentrations of $H_2SO_4$ with the Aid of IL-$NO_3$ A series of experiments (1-8) were made to correlate the distribution of $HNO_3$ and $H_2SO_4$ with ionic liquid of Preparation 1 after $HNO_3$ addition (11.7% $HNO_3$). To this end, four solutions with different $H_2SO_4$ and $HNO_3$ concentrations (see Table 9) were mixed at various proportions (see Table 10), using a vortex mixer for 5 minutes at 80° C.

TABLE 9

|  | $H_2SO_4$ (wt %) | $HNO_3$ (wt %) |
| --- | --- | --- |
| solution 1 | 7.62 | 11.2 |
| solution 2 | 0 | 12 |
| solution 3 | 30.3 | 4.69 |
| solution 4 | 37.2 | 1.4 |

TABLE 10

| Exp. | solution 1 (gr) | solution 2 (gr) | solution 3 (gr) | solution 4 (gr) | Water (gr) | IL-$NO_3$ + 11.7% $HNO_3$ (gr) |
| --- | --- | --- | --- | --- | --- | --- |
| 1 | 0.449 | 0.734 |  |  |  | 5.28 |
| 2 | 0.615 | 0.34 |  |  |  | 4.96 |
| 3 | 0.843 |  |  |  |  | 5.17 |
| 4 |  |  | 1.052 |  | 1.654 | 5.44 |
| 5 |  | 0.582 |  | 0.365 |  | 5.23 |
| 6 |  | 0.806 |  | 0.224 |  | 4.97 |
| 7 |  | 0.779 |  |  |  | 5.06 |
| 8 |  |  |  | 0.89 |  | 5.3 |

In all cases, the resultant liquid consists of clear IL-$NO_3$ phase and aqueous phase. Concentrations of the two acids in the two phases were determined as follows:

$[H^+]$ in the aqueous and IL-$NO_3$ phases was determined by titration with standard sodium hydroxide (0.1N solution using Phenolphthalein indicator).

$[NO_3^-]$ in the aqueous phase was measured by $NO_3$ electrode (nitrate Ion Meter $NO_3$-11 electrode from HORIBA).

$[NO_3^-]$ in the IL-$NO_3$ was determined by calculating the difference between the H+ and the $SO_4^{2-}$ concentration.

$[SO_4^{2-}]$ in the IL-$NO_3$ was measured by washing the acids from the IL-$NO_3$ with water and $H_2O_2$ then measuring by visocolor sulfate test (Machery-Nagel).

$[SO_4^{2-}]$ in the aqueous phase was determined by calculating the difference between the H+ and the $NO_3^-$ concentrations.

The results are tabulated in Table 11.

TABLE 11

|  | aqueous phase | | Ionic liquid phase | | Distribution coefficient | | Selectivity constant |
| --- | --- | --- | --- | --- | --- | --- | --- |
| Exp. No. | $HNO_3$ wt % | $H_2SO_4$ wt % | $HNO_3$ t % | $H_2SO_4$ t % | $NO_3$ Kd | $H_2SO_4$ d | $NO_3/SO_4$ selectivity |
| 1 | 1.4 | 3.8 | 1.7 | 0.113 | 1.03 | 0.030 | 35 |
| 2 | 2.5 | 4.3 | 12.1 | 0.10 | 0.97 | 0.024 | 40 |
| 3 | 9.31 | 7.0 | 11.7 | 0.16 | 1.26 | 0.023 | 56 |
| 4 | 4.54 | 12.0 | 10.9 | 0.46 | 2.39 | 0.038 | 62 |
| 5 | 3.71 | 20.8 | 11.3 | 0.83 | 3.04 | 0.040 | 76 |
| 6 | 3.05 | 27.2 | 12.2 | 1.25 | 4.02 | 0.046 | 87 |
| 7 | 2.00 | 32.2 | 12.0 | 1.81 | 6.00 | 0.056 | 107 |
| 8 | 1.00 | 36.5 | 12.7 | 2.04 | 12.79 | 0.056 | 228 |

Figure 6:
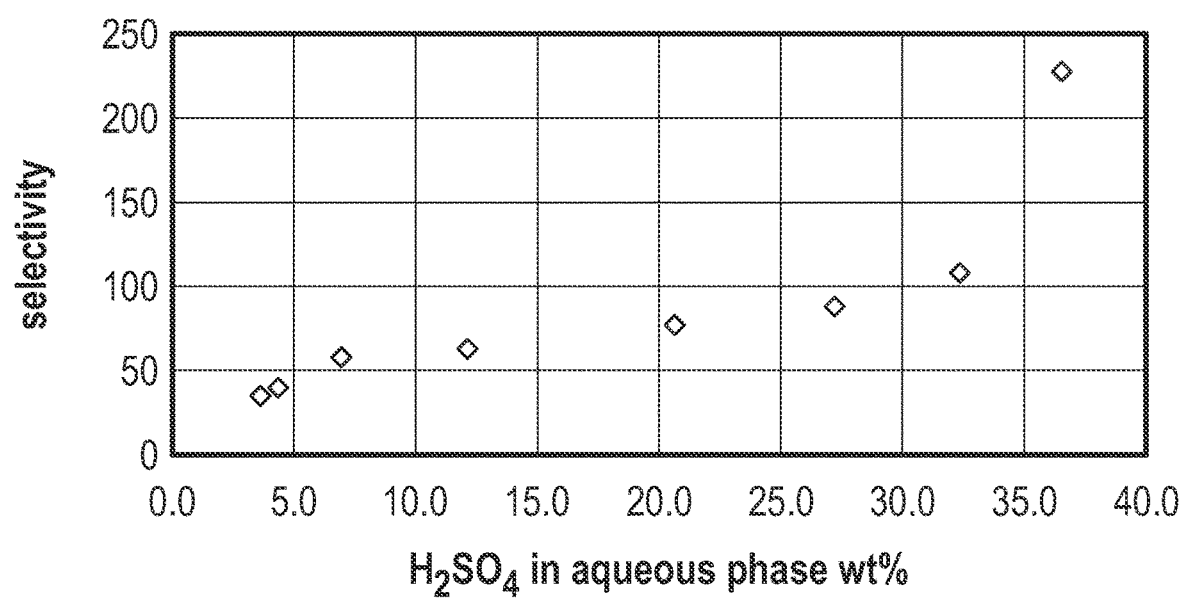
FIG. 6 is a selectivity versus [H$_2$SO$_4$] plot based on HNO$_3$ extraction from aqueous HNO$_3$+H$_2$SO$_4$ mixtures.

Results are also presented graphically in FIG. 6, where selectivity is plotted versus concentration of sulfuric acid. Counterintuitively, it is seen that distribution coefficient and the selectivity of nitrate removal by the ionic liquid increase with increasing concentration of the sulfate "competitor".

Example 9

Separation of Nitric Acid from a Mixture of $H_3PO_4$ and $HNO_3$ with IL-$NO_3$ A series of experiments were made to measure the distribution of $HNO_3$ and $H_3PO_4$ with ionic liquid of Preparation 1 (IL-$NO_3$). To this end, solution C1 (which consists of 4.3 wt % $HNO_3$ and 18.4% $H_3PO_4$ in water) or solution C2 (which consist of 7.5 wt % $HNO_3$ and 21 wt % $H_3PO_4$ in water) and IL-$NO_3$ were mixed at various proportions set out in Table 12, using a vortex mixer for 5 minutes at 85° C.

TABLE 12

| Experiment No. | Solution C1 (gr) | Solution C$_2$ (gr) | IL-NO$_3$ (gr) |
|---|---|---|---|
| 1 | 0.613 | | 0.928 |
| 2 | 0.752 | | 0.9 |
| 3 | 0.758 | | 2.0 |
| 4 | | 0.840 | 0.840 |
| 5 | | 0.868 | 0.868 |
| 6 | | 1.370 | 1.370 |

In all cases, the resultant liquid consists of clear IL-$NO_3$ phase and aqueous phase. Concentrations of the two acids were determined as follows:

[H$^+$] was determined separately in each phase by titration with standard sodium hydroxide (0.1N solution using Phenolphthalein indicator).

[$NO_3^-$] in the aqueous phase was measured by $NO_3$ electrode (nitrate Ion Meter $NO_3^-$ 11 LAQUA twin electrode from HORIBA).

[$NO_3^-$] in the IL-$NO_3$ was measured by washing the acids from the IL-$NO_3$ with sodium bicarbonate solution and $H_2O_2$ then measuring by the $NO_3$ electrode.

[$PO_4^{3-}$] in the IL-$NO_3$ was determined by calculating the difference between H$^+$ and $NO_3^-$ concentrations.

[$PO_4^{3-}$] in the aqueous phase was determined by calculating the difference between H$^+$ and $NO_3^-$ concentrations.

The results are tabulated in Table 13.

TABLE 13

| | Aqueous phase composition | | IL-NO$_3$ phase composition | | Distribution coefficient | | Selectivity constant |
|---|---|---|---|---|---|---|---|
| | HNO$_3$ wt % | H$_3$PO$_4$ wt % | HNO$_3$ wt % | H$_3$PO$_4$ wt % | NO$_3$ Kd | H$_3$PO$_4$ Kd | NO$_3$/PO$_4$ selectivity |
| 1 | 2.35 | 16.1 | 3.78 | 1.9 | 1.61 | 0.12 | 14.0 |
| 2 | 2.95 | 17.3 | 4.57 | 1.9 | 1.55 | 0.11 | 13.9 |
| 3 | 1.17 | 15.5 | 1.89 | 1.9 | 1.62 | 0.12 | 13.3 |
| 4 | 4.95 | 20.8 | 6.98 | 3.4 | 1.41 | 0.17 | 8.5 |
| 5 | 5.73 | 20.0 | 6.55 | 3.3 | 1.14 | 0.16 | 7.0 |
| 6 | 6.38 | 20.7 | 7.45 | 3.3 | 1.17 | 0.16 | 7.2 |

Figure 7:
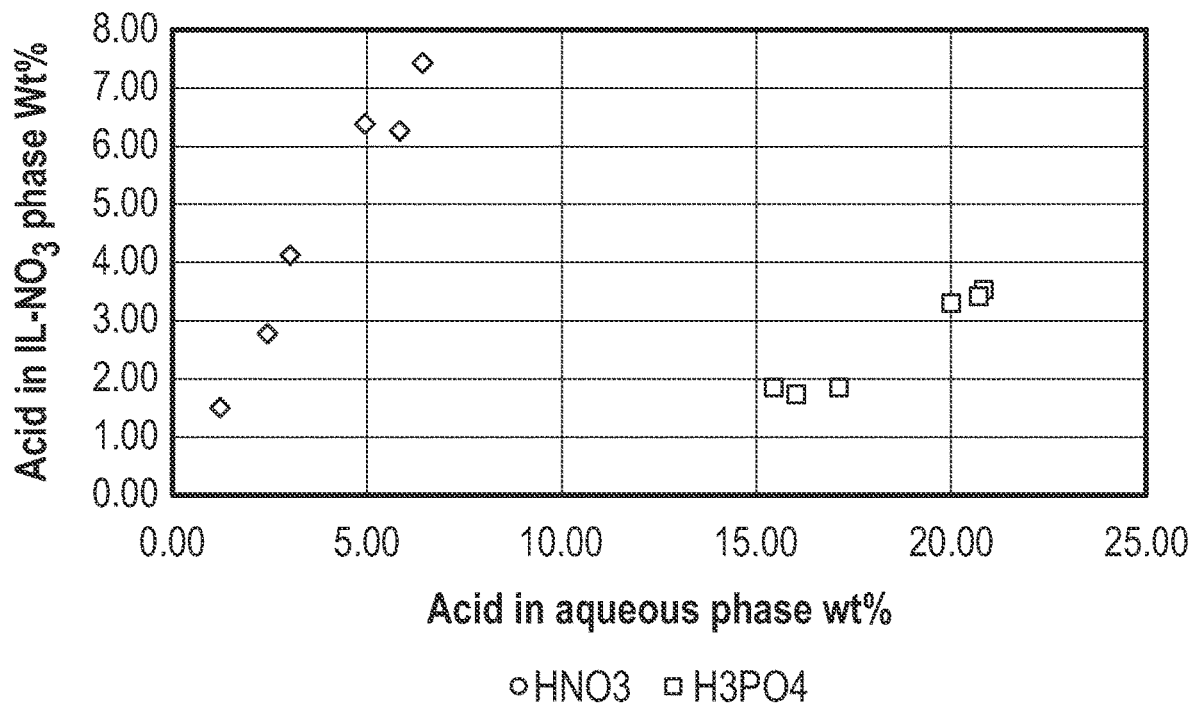
FIG. 7 shows results of HNO$_3$ extraction from aqueous HNO$_3$+H$_3$PO$_4$ mixture.

The results are also presented graphically in FIG. 7. The abscissa and ordinate of each point in the graph are (rhombuses—$HNO_3$; squares—$H_3PO_4$):

$\{[Y]_{aqueous\ phase}; [Y]_{IL-NO3}\}_i$, where $[Y]_{aqueous\ phase}$ indicates the concentration of the acid under consideration in the aqueous phase and $[Y]_{IL-NO3}$ indicates the concentration of the acid in the ionic liquid for each of the six experiments (i=1, 2, 3, 4, 5, 6), based on the data tabulated in Table 13.

Example 10

Separation of Nitric Acid from a Mixture of $H_2SO_4$ and $HNO_3$ with IL-$NO_3$ in a Solvent A series of experiments were conducted to measure the distribution of $HNO_3$ and $H_2SO_4$ with the ionic liquid of Preparation 1 (IL-$NO_3$ 70% in decane). To this end, solution D (which consists of 10.1 wt % $HNO_3$ and 24% $H_2SO_4$ in water) and IL-$NO_3$ in decane were mixed at various proportions set out in Table 14, using a vortex mixer for 5 minutes at 65° C.

TABLE 14

| Experiment No. | Solution D (gr) | IL-NO$_3$ 70% in decane (gr) |
|---|---|---|
| 1 | 0.613 | 1.640 |
| 2 | 0.752 | 2.290 |
| 3 | 0.758 | 1.051 |
| 4 | 0.845 | 0.774 |
| 5 | 1.700 | 0.808 |
| 6 | 2.800 | 0.778 |
| 7 | 3.070 | 0.764 |

In all cases, the resultant liquid consists of clear IL-$NO_3$ phase and aqueous phase. Concentrations of the two acids were determined as follows:

[H+] was determined separately in the aqueous and organic phases by titration with standard sodium hydroxide (0.1N solution using Phenolphthalein indicator).

[$NO_3^-$] in the aqueous phase was measured by $NO_3$ electrode (nitrate Ion Meter $NO_3^-$ 11 LAQUA twin electrode from HORIBA).

[$NO_3^-$] in the IL-$NO_3$ was measured by washing the acids from the IL-$NO_3$ with sodium bicarbonate solution and $H_2O_2$ then measuring by the $NO_3$ electrode.\

[$SO_4^{2-}$] in the IL-$NO_3$ was determined by calculating the difference between H+ and $NO_3^-$ concentrations.

[$SO_4^{2-}$] in the aqueous phase was determined by calculating the difference between H$^+$ and $NO_3^-$ concentrations.

The results are tabulated in Table 15.

TABLE 15

| Exp. No. | Aqueouse phase composition | | IL-NO3 in decane phase composition | | | | Distribution coefficient | | Selectivity constant |
|---|---|---|---|---|---|---|---|---|---|
| | HNO$_3$ wt % | H$_2$SO$_4$ wt % | HNO$_3$ wt % | H$_2$SO$_4$ wt % | HNO3 Z | H2SO4 Z | HNO$_3$ Kd | H$_2$SO$_4$ Kd | HNO$_3$/H$_2$SO$_4$ selectivity |
| 1 | 0.61 | 23.6 | 2.76 | 2.45 | 0.35 | 0.20 | 4.54 | 0.10 | 44 |
| 2 | 0.54 | 14.9 | 2.80 | 1.74 | 0.35 | 0.14 | 5.15 | 0.12 | 44 |
| 3 | 1.20 | 18.2 | 4.08 | 1.56 | 0.51 | 0.13 | 3.40 | 0.09 | 40 |
| 4 | 2.10 | 17.8 | 5.20 | 1.49 | 0.66 | 0.12 | 2.48 | 0.08 | 30 |
| 5 | 3.67 | 18.9 | 7.14 | 0.77 | 0.92 | 0.065 | 1.94 | 0.04 | 48 |
| 6 | 4.30 | 18.7 | 8.10 | 0.49 | 1.05 | 0.041 | 1.88 | 0.03 | 72 |

Example 11

Separation of Nitric Acid from a Mixture of $H_2SO_4$ and $HNO_3$ with Aliquat336-$NO_3$ A series of experiments were performed to measure the distribution of $HNO_3$ and $H_2SO_4$ with ionic liquid of Preparation 2 (Aliquat 336-$NO_3$). To this end, Solution A (which consists of 6.7 wt % $HNO_3$ and 20% $H_2SO_4$ in water) and Aliquat 336-$NO_3$ were mixed at various proportions set out in Table 16, using a vortex mixer for 5 minutes at 80° C.

TABLE 16

| Experiment No. | Solution A (gr) | Aliquat 336-$NO_3$ |
|---|---|---|
| 1 | 2.40 | 0.919 |
| 2 | 1.22 | 1.400 |
| 3 | 0.61 | 1.370 |
| 4 | 1.27 | 0.686 |
| 5 | 2.20 | 0.768 |

In all cases, the resultant liquid consists of clear Aliquat 336-$NO_3$ phase and aqueous phase. Concentrations of the two acids were determined as follows:

[H+] was determined separately in the aqueous and organic phases by titration with standard sodium hydroxide (0.1N solution using Phenolphthalein indicator).

[$NO_3^-$] in the aqueous phase was measured by $NO_3$ electrode (nitrate Ion Meter $NO_3^-$ 11 LAQUA twin electrode from HORIBA).

[$NO_3^-$] in the IL-$NO_3$ was measured by washing the acids from the IL-$NO_3$ with sodium bicarbonate solution and $H_2O_2$ then measuring by the $NO_3$ electrode.

[$SO_4^{2-}$] in the IL-$NO_3$ was determined by calculating the difference between H+ and $NO_3^-$ concentrations.

[$SO_4^{2-}$] in the aqueous phase was determined by calculating the difference between $H^+$ and $NO_3^-$ concentrations.

The results are tabulated in Table 17.

Figure 8:
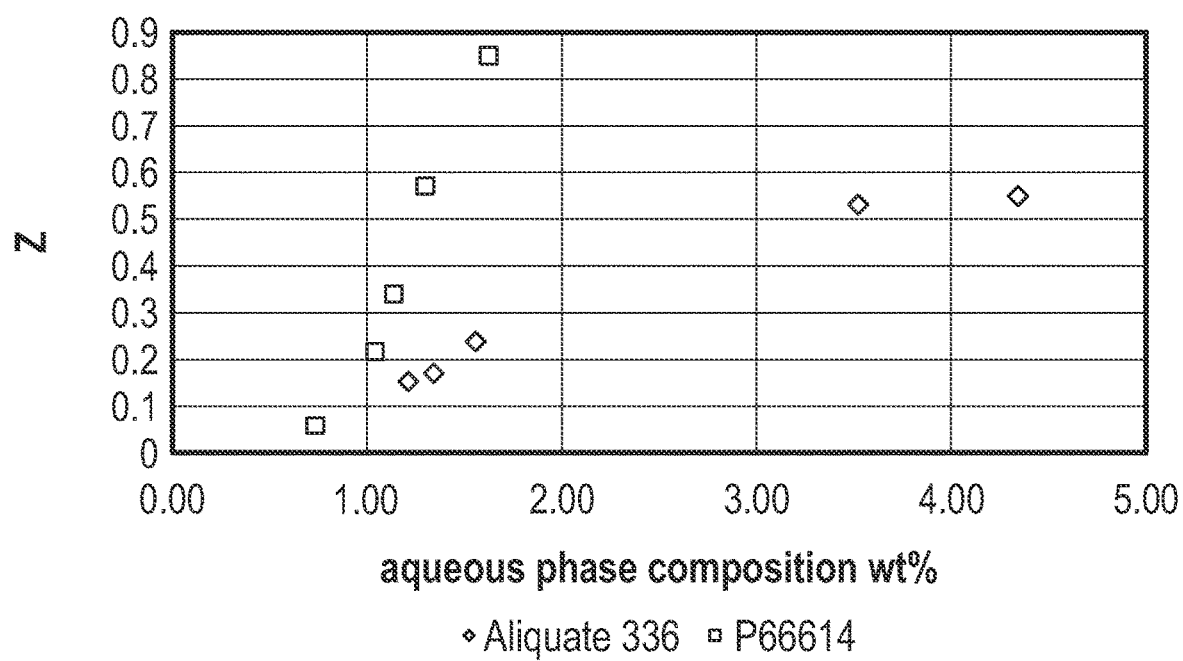
FIG. 8 is Z versus concentration plot comparing the performance of two ionic liquids.
Figure 9:
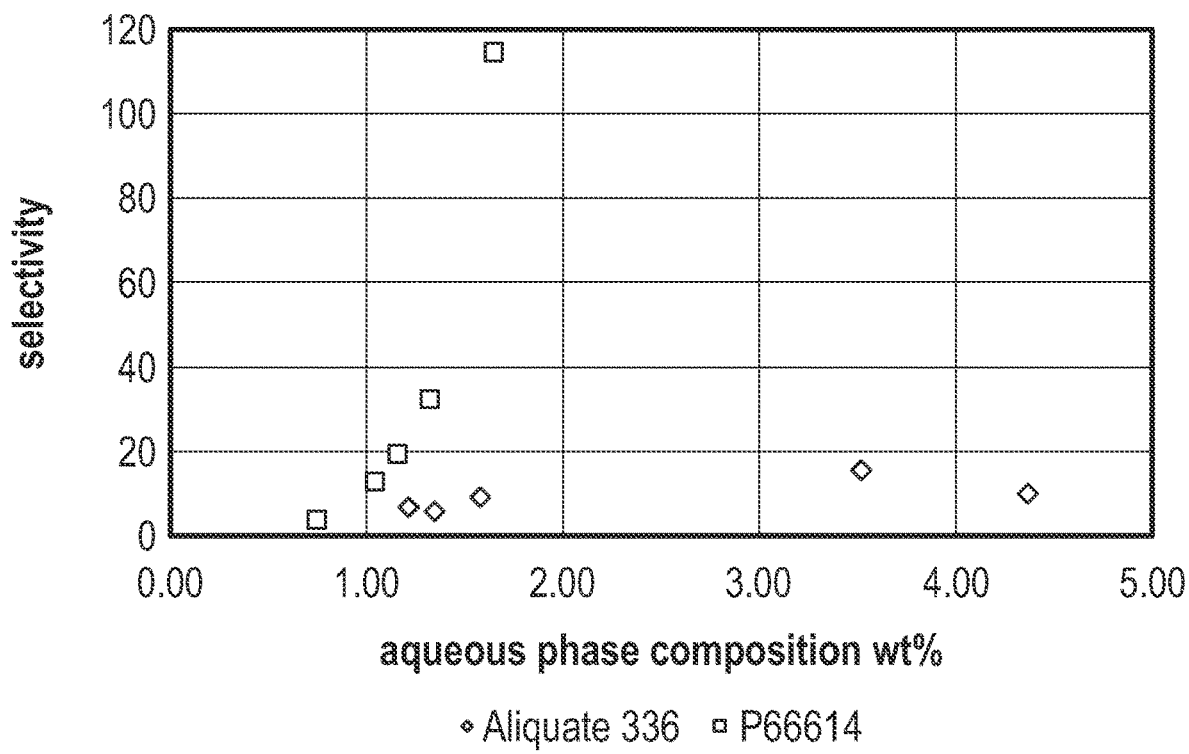
FIG. 9 is selectivity versus concentration plot comparing the performance of two ionic liquids.
Figure 10:
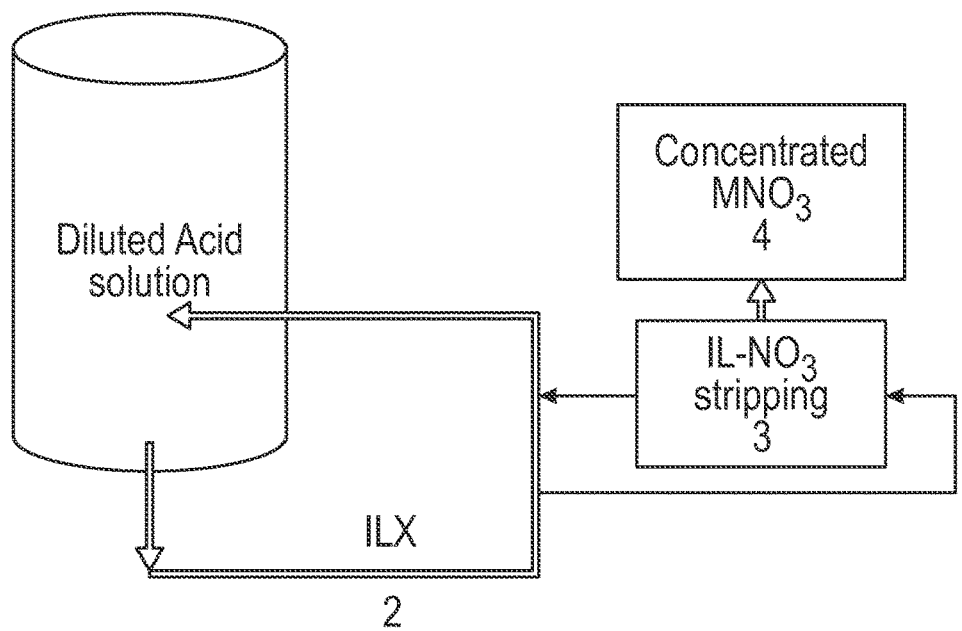
FIG. 10 is a schematic illustration of extraction of nitrate from an aqueous mixture of acids.
Figure 11:
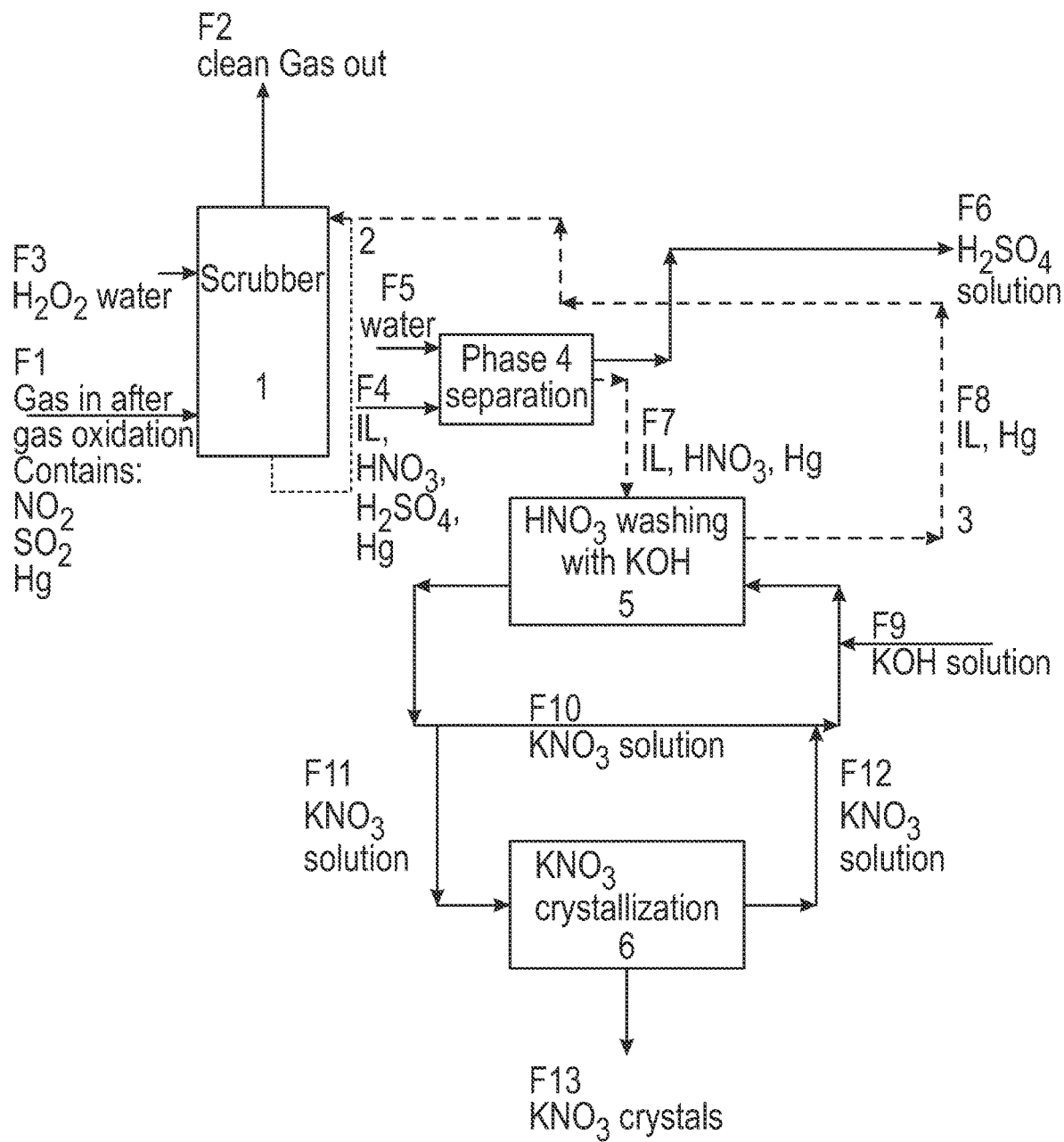
FIG. 11 is a schematic illustration of an apparatus used for purifying flue gases and recovering nitrate therefrom.
Figure 12:
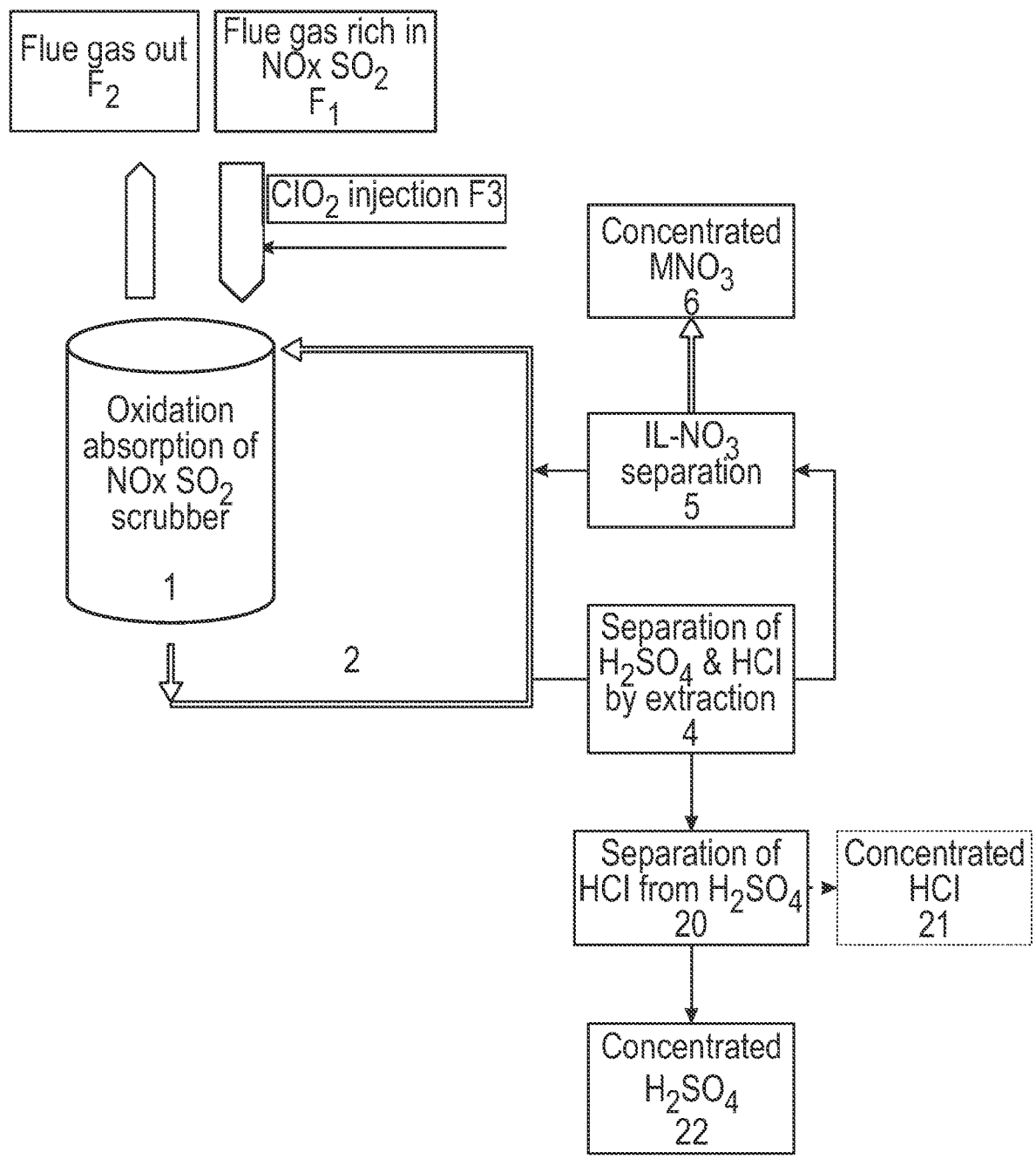
FIG. 12 is a schematic illustration of a process of purifying flue gases and recovering nitrate, HCl and H$_2$SO$_4$ therefrom.

The results are shown graphically in FIGS. 8 and 9 (Z versus [$HNO_3$] in the aqueous solution and selectivity versus [$HNO_3$] in the aqueous solution, respectively), including the data pertaining to IL-$NO_3$. The results indicate the better performance of phosphonium ionic liquid (P66614 marked by squares) compared to ammonium ionic liquid (marked by rhombuses).

Example 12

Separation of nitric acid from a mixture of $HNO_3$, $H_2SO_4$ and KF with IL-$NO_3$ An experiment was performed to measure the distribution of $NO_3^-$, $SO_4^{2-}$ and $F^-$ with ionic liquid of Preparation 1 (IL-NO3). To this end, 2.9 gr of solution consisting of 8.7% KF, 7.9% $HNO_3$ and 18.7% $H_2SO_4$ in water and 3.5 gr IL-$NO_3$ were mixed using a vortex mixer for 5 minutes at 80° C.

The resultant liquid consists of clear organic and aqueous phases. Concentrations of the two acids were determined as follows:

[$H^+$] was determined separately in each phase by titration with standard sodium hydroxide (0.1N solution using Phenolphthalein indicator).

[$NO_3$] in the aqueous phase was measured by $NO_3$ electrode (nitrate Ion Meter $NO_3^-$ 11 LAQUA twin electrode from HORIBA).

[$NO_3$] in the IL-$NO_3$ was measured by washing the acids from the IL-$NO_3$ with sodium bicarbonate solution and $H_2O_2$ then measuring by $NO_3$ electrode.

[$SO_4$] in the IL-$NO_3$ was measured by washing the acids from the IL-$NO_3$ with sodium bicarbonate solution and $H_2O_2$ then measuring by visocolor sulfate test (Machery-Nagel).

[$SO_4$] in the aqueous phase was calculated by mass balance.

TABLE 17

| | aqueous phase | | Ionic liquid phase | | | | | | |
|---|---|---|---|---|---|---|---|---|---|
| Experiment No. | $HNO_3$ wt % | $H_2SO_4$ wt % | $HNO_3$ wt % | $H_2SO_4$ wt % | NO3 Z | H2SO4 Z | $HNO_3$ Kd | $H_2SO_4$ Kd | NO3/SO4 selectivity |
| 1 | 1.57 | 18.8 | 3.38 | 4.61 | 0.24 | 0.21 | 2.15 | 0.25 | 8.7 |
| 2 | 1.35 | 14.4 | 2.60 | 5.10 | 0.18 | 0.23 | 1.92 | 0.35 | 5.4 |
| 3 | 1.21 | 11.0 | 2.40 | 3.15 | 0.16 | 0.14 | 1.98 | 0.29 | 6.9 |
| 4 | 3.51 | 18.9 | 7.40 | 2.59 | 0.53 | 0.12 | 2.11 | 0.14 | 15.3 |
| 5 | 4.36 | 19.7 | 7.53 | 3.58 | 0.54 | 0.17 | 1.73 | 0.18 | 9.5 |

HF in the IL-NO$_3$ was determined by calculating the difference between H$^+$ concentration and the sum of the NO$_3^-$+SO$_4^-$ concentrations.

[F] in the aqueous phase was calculated by mass balance. The results are tabulated in Table 18.

TABLE 18

| Aqueous phase composition | | | IL-NO3 phase composition | | | Distribution coefficient | | | Selectivity | |
|---|---|---|---|---|---|---|---|---|---|---|
| NO$_3^-$ | F$^-$ | SO$_4^-$ | HNO$_3$ | HF | H$_2$SO$_4$ | NO$_3^-$ | F$^-$ | SO$_4^-$ | constant | |
| wt % | Wt % | Wt % | wt % | Wt % | wt % | Kd | Kd | Kd | NO$_3$/F | NO$_3$/SO$_4$ |
| 3.68 | 1.19 | 15.8 | 4.55 | 0.53 | 2.4 | 1.24 | 0.22 | 0.13 | 5.6 | 9.5 |

Example 13

Separation of Mercury from a Mixture of HNO$_3$ and HgCl$_2$ with IL-NO$_3$

One experiment was performed to measure the partition of water-soluble mercury salt (HgCl$_2$) between an aqueous solution and an ionic liquid bearing nitrate as counter ion, IL-NO$_3$. To this end, a solution consisting of 31.2 wt % HNO$_3$ and 119 ppm HgCl$_2$ in water and 5.1 gr IL-NO$_3$ were mixed using a vortex mixer for 5 minutes at 80° C. Sample from the aqueous phase was taken for analysis with DMA-80 by MILESTONE INC mercury analyzer.

[HNO$_3$] in the IL-NO$_3$ was determined by titration with standard sodium hydroxide (0.1N solution using Phenolphthalein indicator).

[HNO$_3$] in the aqueous phase was determined by titration with standard sodium hydroxide (0.1N solution using Phenolphthalein indicator).

The results are shown in Table 19.

TABLE 19

| Aqueous phase composition | | IL-NO3 phase composition | | Distribution coefficient | | Selectivity |
|---|---|---|---|---|---|---|
| HNO$_3$ Wt % | Hg ppm | HNO$_3$ Wt % | Hg ppm | NO$_3$ Kd | Hg Kd | constant NO$_3$/Hg |
| 10.71 | 0.07 | 10.19 | 47 | 0.95 | 672 | 0.0014 |

The results indicate that mercury ions are captured in the organic (ionic liquid) phase and their escape to the aqueous phase is negligible. The mercury could then be recovered from the ionic liquid.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A process for recovering nitric acid or salts thereof, comprising: contacting, in the presence of water, an water-immiscible ionic liquid of the formula [A$^+$][X$^-$], wherein the ionic liquid [A$^+$][X$^-$] with which the process begins is [R$_1$R$_2$R$_3$R$_4$P$^+$][X$^-$] wherein R$_1$, R$_2$, R$_3$ and R$_4$ are the same or different and wherein at least two of R$_1$, R$_2$, R$_3$ and R$_4$ are C5-C15 alkyl groups and [X$^-$] is chloride, bromide or nitrate, with a fluid which contains HNO$_3$ and at least one more mineral acid, or precursors of said acids, and partition, under mixing, said acids between aqueous and organic phases and form nitrate-loaded ionic liquid of the formula [A$^+$][NO$_3^-$]$_{z>0.25}$ where Z indicates a molar amount of nitrate held in the ionic liquid beyond the positions occupied by the nitrate counter ions;

separating the so-formed mixture into an organic phase comprising a nitrate-loaded ionic liquid of the formula [A$^+$][NO$_3^-$]$_{z>0.25}$ and an aqueous phase consisting of a nitrate-depleted aqueous solution that contains the other mineral acid(s);

stripping the nitric acid from said nitrate-loaded ionic liquid to create an aqueous nitrate solution and regenerate ionic liquid of the formula [A$^+$][NO$_3^-$]$_{z\geq 0}$ with reduced nitrate loading, or unloaded [A$^+$][NO$_3^-$]$_{z=0}$ ionic liquid.

2. The process according to claim 1, wherein the one or more mineral acids is(are) selected from the group consisting of sulfuric acid, phosphoric acid and hydrohalic acids.

3. The process according to claim 1, wherein the ionic liquid with which the process begins is (CH$_3$(CH$_2$)$_5$)$_3$P$^+$(CH$_2$)$_{13}$CH$_3$][Cl$^-$] or [(CH$_3$(CH$_2$)$_5$)$_3$P$^+$(CH$_2$)$_{13}$CH$_3$][NO$_3^-$].

4. The process according to claim 1 wherein the ionic liquid is dissolved in one or more water-immiscible organic solvents.

5. The process according to claim 1, wherein the stripping of the nitrate from the ionic liquid to create an aqueous nitrate solution is achieved with the aid of a stripping reagent selected from the group consisting of water, an aqueous base solution, an aqueous salt solution, or a mixture thereof; or by heating the ionic liquid, optionally under reduced pressure, to release gaseous HNO$_3$ followed by absorption into an aqueous solution.

6. The process according to claim 5, wherein the stripping reagent is potassium hydroxide or a mixture of potassium hydroxide and potassium nitrate.

7. The process according to claim 1, wherein the fluid is an aqueous acidic solution, the process being applied for producing nitric acid or potassium nitrate through selective liquid-liquid extraction of nitrate from said aqueous acidic solution.

8. The process according to claim 1, wherein loading of the ionic liquid with nitrate creates [A$^+$][NO$_3^-$]$_{z>0.75}$.

9. A process for producing nitric acid or nitrate salts by liquid-liquid extraction of nitrate from an aqueous stream that contains nitric acid and at least one more mineral acid, said process comprising the steps of:

an extraction step, which comprises contacting an extractant which is an water-immiscible ionic liquid of the formula [A$^+$][X$^-$], wherein the extractant [A$^+$][X$^-$] is [R$_1$R$_2$R$_3$R$_4$P$^+$][X$^-$] wherein R$_1$, R$_2$, R$_3$ and R$_4$ are the same or different and wherein at least two of R$_1$, R$_2$, R$_3$ and R$_4$ are C5-C15 alkyl groups and [X$^-$] is chloride, bromide or nitrate, with an aqueous solution which contains HNO$_3$ and at least one more mineral acid, to partition, under mixing, said acids between aqueous and organic phases and form nitrate-loaded ionic liquid of the formula $[A^+][NO_3^-]_{z>0.25}$ where Z indicates a molar amount of nitrate held in the ionic liquid beyond the positions occupied by the nitrate counter ions;

phase separation step, which comprises separating the so-formed mixture into an organic nitrate-loaded extract of the formula $[A^+][NO_3^-]_{z>0.25}$ and an aqueous raffinate comprising the other mineral acid(s);

a stripping step, which comprises stripping the nitric acid from said organic extract to create an aqueous nitrate solution and regenerate ionic liquid of the formula $[A^+][NO_3^-]_{z\geq0}$ with reduced nitrate loading or unloaded $[A^+][NO_3^-]_{z=0}$ ionic liquid.

10. The process according to claim 9, wherein the one or more mineral acids is(are) selected from the group consisting of sulfuric acid, phosphoric acid and hydrohalic acid.

11. The process according to claim 9, wherein the extractant is $(CH_3(CH_2)_5)_3P^+(CH_2)_{13}CH_3][Cl^-]$ or $[(CH_3(CH_2)_5)_3P^+(CH_2)_{13}CH_3][NO_3^-]$.

12. The process according to claim 9, comprising stripping the nitric acid from the organic extract with potassium hydroxide or a mixture of potassium hydroxide and potassium nitrate.

13. A process for producing nitric acid or salts thereof by removing $NO_x$ from a flue gas, said process comprising the steps of:

passing an oxidized flue gas stream that contains $NO_2$ and $SO_2$ through a gas-liquid contactor, where the flue gas is brought into intimate contact with an water-immiscible ionic liquid of the formula $[A^+][X^-]$, wherein $[A^+]$ represents a phosphonium or ammonium cation and $[X^-]$ represents a counter anion which is $NO_3^-$, an halide anion displaceable by $NO_3^-$, or both, in the presence of an aqueous oxidizer, and form nitrate-loaded ionic liquid of the formula $[A^+][NO_3^-]_{z>0.25}$ where Z indicates a molar amount of nitrate held in the ionic liquid beyond the positions occupied by the nitrate counter ions;

releasing a purified flue gas into the atmosphere;

withdrawing ionic liquid-containing stream from the gas-liquid contactor and feeding regenerated ionic liquid stream back into the gas-liquid contactor through a circulation loop, wherein the ionic liquid-containing stream flows through said circulation loop where it is subjected to regeneration treatment comprising the steps of:

separating the ionic liquid-containing stream, optionally after addition of water, into a first organic stream consisting essentially of $H_2SO_4$-free and HX-free ionic liquid $[A^+][NO_3^-]_{z>0.25}$ and a first aqueous acidic stream which contains $H_2SO_4$ and optionally HX, wherein X is halide;

stripping the nitrate from the organic stream consisting of the ionic liquid $[A^+][NO_3^-]_{z>0.25}$ to create a second aqueous stream which contains $HNO_3$ or salt thereof; and regenerating ionic liquid of the formula $[A^+][NO_3^-]_{z\geq0}$ with reduced nitrate loading or unloaded $[A^+][NO_3^-]_{z=0}$ ionic liquid;

leading said $[A^+][NO_3^-]_{z\geq0}$ with reduced Z value back to the gas-liquid contactor; and recovering $H_2SO_4$ solution from said first aqueous acidic stream and optionally HX solution, wherein X is halide, or salts thereof, and from the second aqueous stream a nitrate salt or nitric acid solution.

14. The process according to claim 13, wherein the ionic liquid used to scrub the flue gas in the liquid-liquid contactor is $[R_1R_2R_3R_4P^+][X^-]$ wherein $R_1$, $R_2$, $R_3$ and $R_4$ are the same or different and wherein at least two of $R_1$, $R_2$, $R_3$ and $R_4$ are C5-C15 alkyl groups and $[X^-]$ is chloride, bromide or nitrate.

15. The process according to claim 14, wherein the ionic liquid used to scrub the flue gas in the liquid-liquid contactor is $(CH_3(CH_2)_5)_3P^+(CH_2)_{13}CH_3][Cl^-]$ or $[(CH_3(CH_2)_5)_3P^+(CH_2)_{13}CH_3][NO_3^-]$.

16. The process according to claim 13, wherein the stripping of the nitrate from the ionic liquid to create an aqueous nitrate solution is achieved with the aid of a stripping reagent selected from the group consisting of water, an aqueous base solution, an aqueous salt solution, or a mixture thereof; or by heating the ionic liquid, optionally under reduced pressure, to release gaseous $HNO_3$ followed by absorption into an aqueous solution.

17. The process according to claim 13, wherein the flue gas further comprises mercury, which is recovered from the organic phase consisting of the ionic liquid.

18. A process for recovering nitric acid or salts thereof, comprising:

contacting, in the presence of water, an water-immiscible ionic liquid of the formula $[A^+][X^-]$, wherein $[A^+]$ represents a phosphonium or ammonium cation and $[X^-]$ represents a counter anion which is $NO_3^-$, an halide anion displaceable by $NO_3^-$, or both, with an oxidized flue gas that contains $NO_2$ and $SO_2$, and partition, under mixing, $HNO_3$ and $H_2SO_4$ between an aqueous phase and the organic phase to form nitrate-loaded ionic liquid of the formula $[A^+][NO_3^-]_{z>0.25}$ where Z indicates a molar amount of nitrate held in the ionic liquid beyond the positions occupied by the nitrate counter ions;

separating the so-formed mixture into an organic phase comprising a nitrate-loaded ionic liquid of the formula $[A^+][NO_3^-]_{z>0.25}$ and an aqueous phase consisting of a nitrate-depleted aqueous solution that contains the other mineral acid(s);

stripping the nitric acid from said nitrate-loaded ionic liquid to create an aqueous nitrate solution and regenerate ionic liquid of the formula $[A^+][NO_3^-]_{z\geq0}$ with reduced nitrate loading, or unloaded $[A^+][NO_3^-]_{z=0}$ ionic liquid.

* * * * *